United States Patent
Bower et al.

(10) Patent No.: US 11,062,249 B2
(45) Date of Patent: Jul. 13, 2021

(54) ELECTRONIC MESSAGE MANAGEMENT PROGRAM COORDINATING DEFINED ACTIVITY AND CONTROLLED RECIPIENT/RESPONDENTS THROUGH A UNIQUE ID

(71) Applicant: Telesolve, Inc., Dallas, TX (US)

(72) Inventors: David S Bower, Dallas, TX (US); Kai Zhu, Dallas, TX (US)

(73) Assignee: TELESOLVE, INC., Dallas, TX (US)

( * ) Notice: Subject to any disclaimer, the term of this patent is extended or adjusted under 35 U.S.C. 154(b) by 821 days.

(21) Appl. No.: 14/853,864

(22) Filed: Sep. 14, 2015

(65) Prior Publication Data

US 2016/0071036 A1    Mar. 10, 2016

Related U.S. Application Data

(63) Continuation of application No. PCT/US2014/028908, filed on Mar. 14, 2014.

(60) Provisional application No. 61/798,812, filed on Mar. 15, 2013.

(51) Int. Cl.
| | |
|---|---|
| *G06Q 10/06* | (2012.01) |
| *G06Q 10/10* | (2012.01) |
| *H04L 12/24* | (2006.01) |
| *G06F 3/0482* | (2013.01) |

(52) U.S. Cl.
CPC ....... *G06Q 10/0637* (2013.01); *G06F 3/0482* (2013.01); *G06Q 10/06* (2013.01); *G06Q 10/10* (2013.01); *H04L 41/026* (2013.01)

(58) Field of Classification Search
CPC .......................... G06Q 10/0637; G06F 3/0482
See application file for complete search history.

(56) References Cited

U.S. PATENT DOCUMENTS

| | | | |
|---|---|---|---|
| 7,738,899 B1 * | 6/2010 | Manroa | G06Q 30/0224 455/412.2 |
| 8,385,897 B1 * | 2/2013 | Yadav-Ranjan | H04M 3/42382 455/412.1 |
| 9,202,218 B1 * | 12/2015 | Crisman | G06Q 30/00 |
| 2002/0051183 A1 * | 5/2002 | Tsukui | H04N 1/00209 358/1.15 |
| 2004/0148466 A1 * | 7/2004 | Morishita | G06F 12/0848 711/129 |
| 2004/0260756 A1 * | 12/2004 | Forstall | H04L 51/00 709/200 |
| 2005/0234850 A1 * | 10/2005 | Buchheit | G06Q 10/10 |

(Continued)

*Primary Examiner* — Philip C Lee

(57) ABSTRACT

A system is disclosed that sends, through one or more messaging modalities, an electronic message containing a system or user generated unique identifier to at least one recipient on a system or user enabled and controlled list. The system receives a response electronic message containing the unique identifier and response data identified by a symbol. The program verifies the validity of the unique identifier and optionally that a sender of the response message is on the list. If the unique identifier is verified, the program correlates the message response data with the unique identifier and sends an additional message replicating the response data to the controlled list as a reply or update concerning the message. The program repeats the receiving, verifying, and sending to allow further updates on the message using the modality of communication.

28 Claims, 28 Drawing Sheets

(56) References Cited

U.S. PATENT DOCUMENTS

| | | | | |
|---|---|---|---|---|
| 2006/0259524 A1* | 11/2006 | Horton | ............... | G06F 17/2288 |
| 2009/0313554 A1* | 12/2009 | Haynes | ............... | G06Q 10/107 |
| | | | | 715/752 |
| 2010/0287023 A1* | 11/2010 | Knobel | ............... | G06Q 10/06 |
| | | | | 705/7.13 |
| 2011/0010665 A1* | 1/2011 | DeLuca | ............... | G06Q 10/107 |
| | | | | 715/810 |
| 2011/0154338 A1* | 6/2011 | Ramanathaiah | ....... | G06Q 10/06 |
| | | | | 718/100 |
| 2011/0179126 A1* | 7/2011 | Wetherell | ............... | H04L 51/36 |
| | | | | 709/206 |
| 2013/0007139 A1* | 1/2013 | Bombacino | ............ | H04L 51/16 |
| | | | | 709/206 |
| 2014/0237055 A1* | 8/2014 | Burrell | ................... | H04L 51/28 |
| | | | | 709/206 |

* cited by examiner

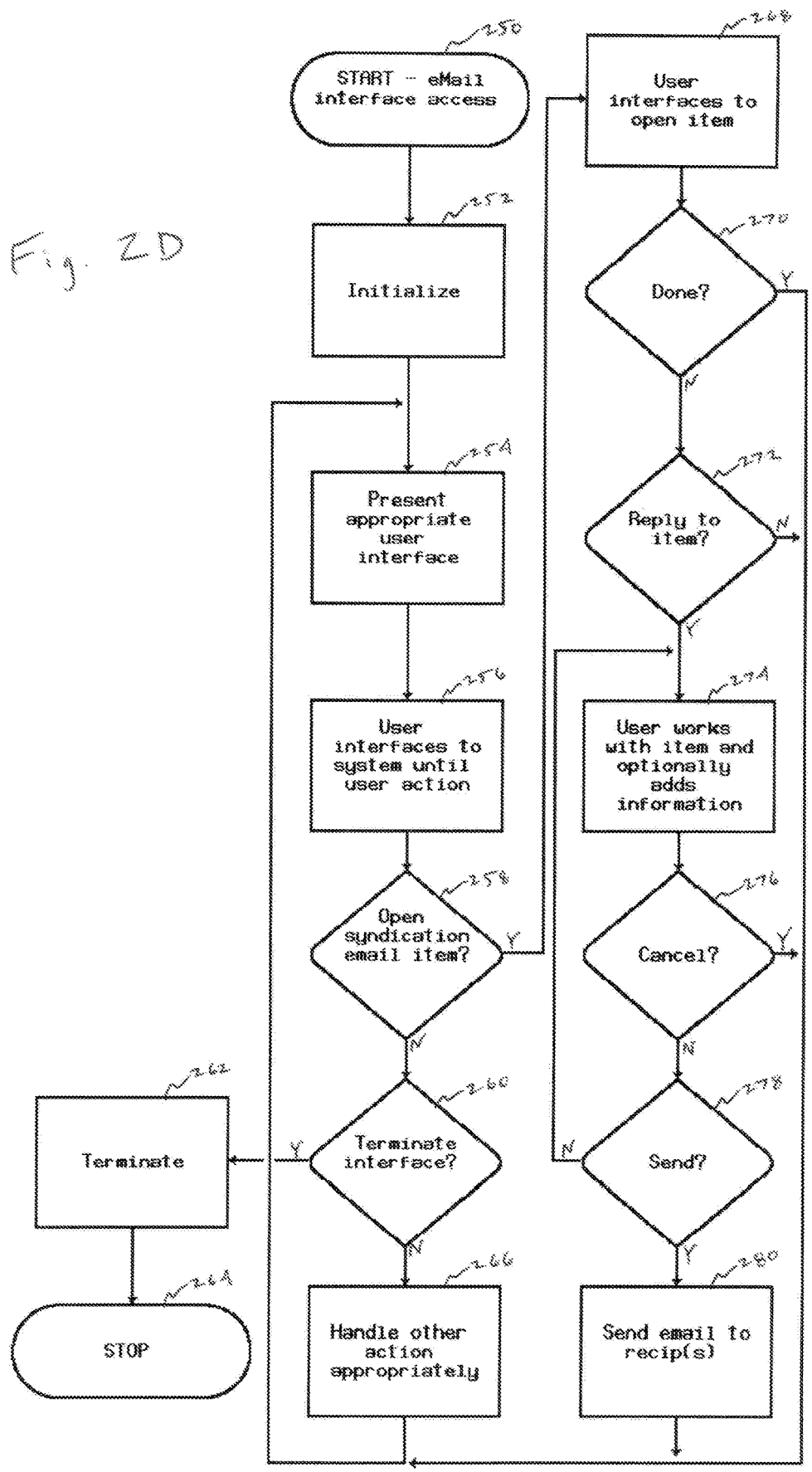

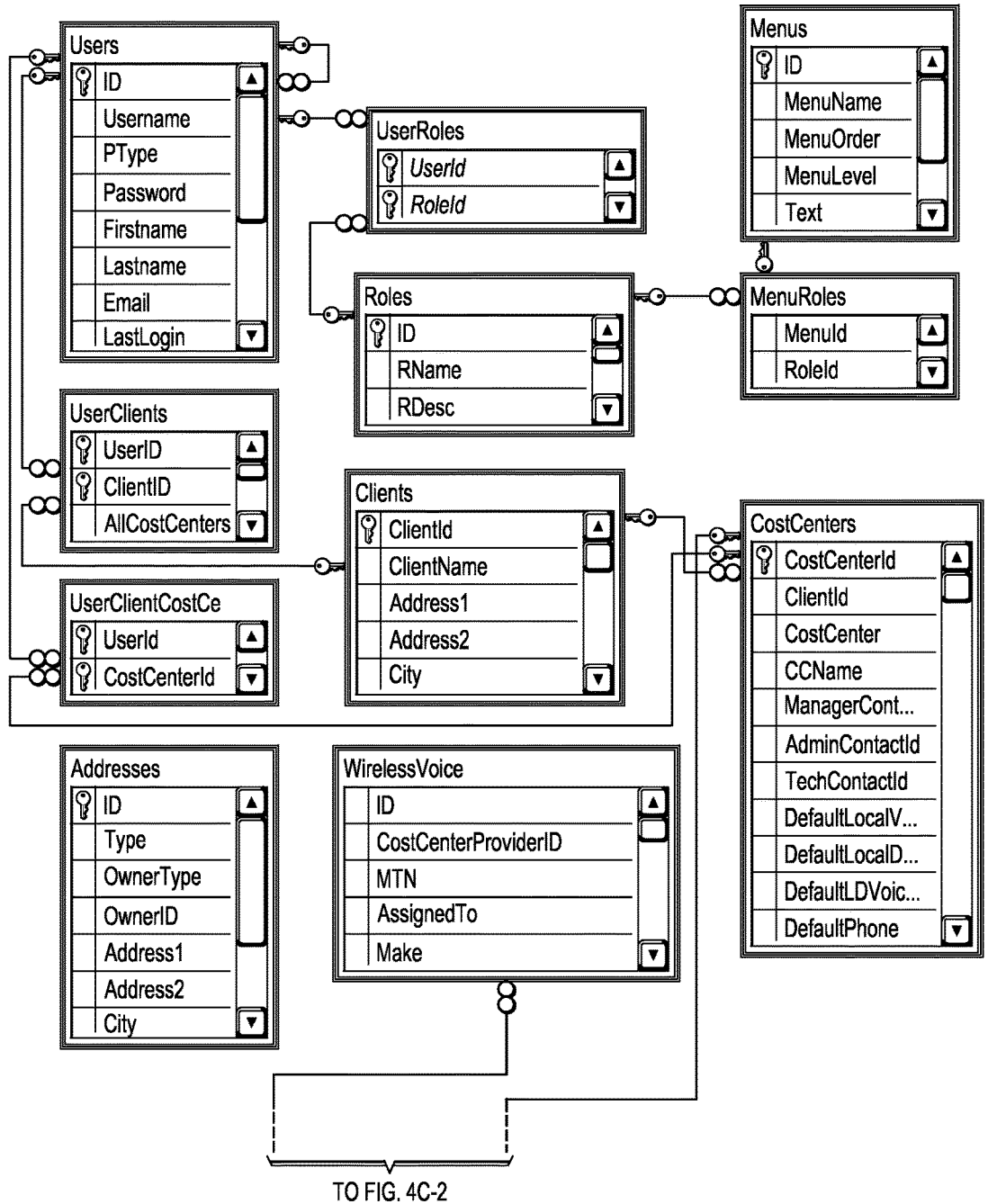

Fig. 5L
Reassign Email Distribution List
Currently Assigned                    Assigned To This Request
ATTWirelessOrders@TEMS.net
sbenny@intelesystems.com
Assign Additional Email Recipient(s) For This Service Request: (separate multiple addresses with ";")
Email Address:
Save Session Settings          Cancel
If No Changes, Select Cancel
Fig. 5M
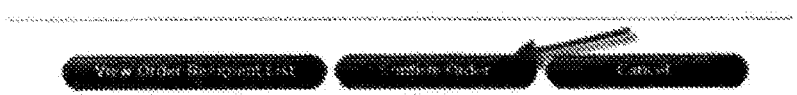
Fig. 5N

ELECTRONIC MESSAGE MANAGEMENT PROGRAM COORDINATING DEFINED ACTIVITY AND CONTROLLED RECIPIENT/RESPONDENTS THROUGH A UNIQUE ID

TECHNICAL FIELD

The present disclosure relates generally to message management, and more particularly to an electronic message management program coordinating defined activity and controlled recipient/respondents through a unique ID.

BACKGROUND

Many business enterprises are involved with different vendors or business partners to facilitate carrying out various business missions. There are various complexities, each specific to the type of equipment and services, for example, provided by such vendors or business partners. Executive management of these enterprises desire streamlining business processes to maximize margins and achieve more with less. An automated system which facilitates streamlining business processes normally involved in the particular enterprise is desirable.

Enterprise Resource Planning (ERP) systems and Customer Relationship Management (CRM) systems have been built to manage assets, service providers, equipment providers, suppliers, specific customers, clients, vendors, project planning milestones, and the like. Such systems house, communicate and manage data specific to each business enterprise to cultivate the ongoing programs, projects and company or people relationships. Some problems with such systems are they are provided as business specific deployments and implementations for the specific contexts of business uses. While there are "off the shelf" products that can be used in a variety of contexts, the business enterprise itself must be concerned with training for the particular context of use, supporting and maintaining systems applicable to the deployment, and storing large amounts of data with context dependent schema and metadata for describing the data. In fact, some businesses use completely different application deployments depending on the particular applications being pursued. Some applications are solved with different applications or different implementations of the same application. It is desirable to provide a business enterprise with a completely generic system containing a generic and globally acceptable schema and metadata facilitating the providing of a single deployment for automating business processes in managing very different applications involving business partners in customer management, inventory management, accounts payable management, contact management, procurement, order management, troubleticket management, provisioning, invoice management and approvals, accounting and various related business processes. Such a diverse set of applications commonly found in a business enterprise would benefit from a generic multi-enterprise-tested platform capable of standardized automated processing and user interfaces across all applications of use. Such a platform would enable minimized training, centralized business enterprise data for a convenient disaster recovery and business continuance model, enhancing user understanding in new contexts of use in identical interfaces, and providing an organized "one-stop" generic business partner management system for key mission critical processes.

Further still, some enterprises are interested in minimized risk models and improved competitiveness. Providing the "one-stop" generic business partner management system as a cloud based service to business enterprises allows the enterprises to outsource tedious validations that may be small in cost, but when numerous occurrences are added up, they result in significant cost savings. The outsourcer can also back their cloud based service with certain guarantees acceptable to a particular business enterprise so as to in effect have an insurance policy against errors and costly mistakes otherwise not caught by employees using manual processes or having lesser skill.

Most business enterprises have electronic mail (eMail) systems. EMail systems form a major backbone of reliable documented communications between management, employees, customers, vendors, partners, and the many people and processes involved in the enterprise. A truly generic system would preferably leverage these existing eMail deployments for a variety of common business activities, thereby seamlessly integrating to a foundation deployment already present in the business enterprise. A truly generic system would support any of a variety of different eMail systems (e.g. Microsoft Outlook/Exchange, Lotus Notes, Internet website eMail, IBM Office Vision eMail platforms, and any other eMail platforms that may be in use) when appropriate.

SUMMARY

A system and method is disclosed for automated management of business partners and their associated assets in favor of, and on behalf of, a plurality of business enterprises in the form of a single owner managed generic system for a variety of common business activities. In one preferred embodiment, the system and method is provided as an on-demand cloud based Software-As-A-Service (SaaS) suite of applications and user interfaces which also store data in the cloud. A particular business enterprise need not have a single entity of hardware infrastructure, data storage infrastructure, or any other overhead hardware footprint except at least one client data processing system having any of a variety of internet browsers. Furthermore, a third party (owner) operator of the present disclosure also need not have any infrastructure or footprint. Of course, any client device is capable of using the SaaS, for example, a personal computer, notebook computer, iPad, iPhone, Android based device, wireless phone or smartphone, tablet computer or any other data processing system. The present disclosure supports all devices having an internet browser. In another embodiment, a third party (owner) operator of the present disclosure chooses to physically manage their own footprint and infrastructure instead of housing functionality at a cloud provider. In yet another embodiment, conventional client/server architecture is implemented in native application form for eliminating the requirement to have an internet browser. In such an embodiment, a client side application may be preinstalled, or downloaded and installed in a convenient manner.

A common set of business process user interfaces, database schema and metadata, enterprise eMail integration methods, and complementary methodologies are implemented around a generic work identifier. The "work identifier" may also be referred to as a "work effort identifier", "work activity identifier", "collaboration identifier", or "WID". The Work Identifier (WID) is preferably a uniquely system generated handle to a particular business activity regardless of the many types of business activities, business applications, contexts of use, and theme of transaction for the business activity. The WID is preferably conveniently generated as a unique identifier by an appropriately used Standard Query Language (SQL) database Application Programming Interface (API), or relevant programming language processed, as well known to those skilled in the art. Otherwise, a suitable WID generation scheme must be employed to ensure uniqueness (e.g. random number generation seed with duplicate detection, round-robin with long life-span precision, etc). The "WID" should be unique across all related business activities for a particular business partner management model of the present disclosure.

Business partner assets and processes have associated data which is stored, managed, joined, associated, and correlated using the WID for a variety of business functionality across a variety of business enterprise common mission critical business partner and asset management requirements. The WID further provides useful correlation when leveraging existing business enterprise eMail systems. The WID facilitates associating eMails from a plurality of senders for a common business activity. A business activity may involve sending eMail to many recipients, each capable of acting on that eMail with data for updating the disclosed system and method.

Technologies are described herein for providing well-integrated legacy eMail system interoperability leveraging the unique WID as a key to associate, join and similarly correlate data from a plurality of users using a plurality of different eMail systems, while maintaining accurate supervisory data in the data warehouse of the present disclosure.

A primary advantage herein is to provide SaaS (or other embodiment as described above) functionality for efficiently carrying out common business enterprise practices and processes in an automated manner. Common practices and processes have been facilitated with a generic implementation capable of supporting a variety of very different business needs such as inventory management, accounts payable management, contact management, procurement, order management, trouble-ticket management, provisioning, invoice management and approvals, accounting and various related business processes. Environments supported are telecommunications, data processing, computing, networking, data storage, and other equipment or asset management requirements across a variety of vertical industries. It is a further advantage to provide such functionality to a plurality of business enterprises in a single instance deployment of the present disclosure.

Another advantage is enabling the owner of the single deployment of the present disclosure to be an insurance provider to the business enterprises for their sought functionality, and at a known cost with known savings. The owner's experience handling a plurality of business enterprises in an automated manner and then continuing to make incremental improvements to the disclosed system based on experiences with different business enterprises in similar circumstances enables a superior system for the benefit of all business enterprises. A thoroughly complete and mature system is provided satisfying many different business enterprises in similar capacities. The disclosed system has become so mature that the owner is able with unprecedented accuracy to contractually promise anticipated savings to new customers, otherwise no monies are due. The owner's system enables a business model for earning a percentage of cost savings achieved for the customer when compared to previous costs relative new costs once the present disclosure system is in use. Support of a plurality of business enterprises is advantageous in solving problems one or more times and then subsequently leveraging that experience for newly supported business enterprises. Additionally, having the owner be a third party provider allows an insurance policy based model when it comes time to legally collect monies from parties which have caused various errors affecting increased costs for the particular business enterprise.

It is an advantage to implement a WID (always unique across activities in particular business model scope) as described above for generically correlating data and eMail for a particular activity of a business partner or business asset. The WID provides a useful key for associating what are otherwise very different data forms.

It is a further advantage to carry additional syntactical keywords in eMail which is outbound from the present disclosure system to various business enterprise eMail systems so as to facilitate parsing the eMail at a subsequent time should it be returned to the present disclosure system after having been viewed, altered, or added to, by any of a plurality of recipients associated with the original outbound distribution. Keywords are preferably subordinate to a WID from a context perspective for accessing, recognizing, parsing, translating and using specific useful data instances within a WID scope. However, syntactical keywords may also be used independent of Work Identifiers (WIDs) so as to direct the described data for a particular purpose. For example, within a WID context, the syntactical keyword string of "new cost center" (or "NCC") in an eMail body provides means for recognizing, parsing, translating and then using the corresponding delimited data to populate the data warehouse of the present disclosure with a new cost center for the client involved with the associated WID. Yet in another example, the syntactical keyword of "remove user" (or "RU") provides means for recognizing, parsing, translating and then using the corresponding delimited data to remove particular explicitly specified recipient(s) from the system for the business enterprise without regard for a WID. For example, the employee(s) no longer work at the business enterprise and therefore should be removed from the system as specified in the sender's eMail. Preferably, easily parsed delimiters are used when keywords are used to facilitate gathering associated data, however more intelligent parse methods may be used thereby not requiring delimiters at all. eMail systems are provided with a variety of eMail keywords for automated processing, most of which are initially originated from the present disclosure system with self-documenting commentary for easy eMail user edits or adds. Of course, a body of an eMail, subject of an eMail, attachment(s) of an eMail, or any other field or associated data of an eMail may contain WIDs or keywords for automated processing.

Another advantage is in supporting a variety of eMail formats. The preferred embodiment sends outbound HTML based eMail for rich recipient functionality, and accepts inbound HTML based eMail for rich processing functionality. All processing is fully automated. Manual processes are only involved when absolutely necessary. Other eMail embodiments are supported regardless of whether parsing eMail bodies, attachments, or other eMail fields. Such formats include XML, flat text, executable procedures to perform (e.g. Javascript), file formats of any variety, etc. Executable procedures provide convenient complex modularized operations for being conditionally executed against the data warehouse of the present disclosure.

Further features and advantages of the disclosure, as well as the structure and operation of various embodiments of the disclosure, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number. None of the drawings, discussions, or materials herein is to be interpreted as limiting to a particular embodiment. The broadest interpretation is intended. Other embodiments accomplishing same functionality are within the spirit and scope of this disclosure. It should be understood that information is presented by example and many embodiments exist without departing from the spirit and scope of this disclosure.

DESCRIPTION OF DRAWINGS

There is no guarantee descriptions in this specification explain every novel feature found in the drawings. The present disclosure will be described with reference to the accompanying drawings, wherein:

FIG. 2D depicts a flowchart for describing a preferred embodiment of detailed generic eMail user interface processing of FIG. 2B;

FIGS. 5C through 5N each depict Graphical User Interface (GUI) screenshots, or an explanatory portion thereof, for a preferred embodiment of place order processing in an ordering process example use of the present disclosure;

FIGS. 7A through 8B each depict Graphical User Interface (GUI) screenshots, or an explanatory portion thereof, for a preferred embodiment of order flow in syndication service form associated with an ordering process example use of the present disclosure.

DETAILED DESCRIPTION

With reference now to detail of the drawings, the present disclosure is described. Obvious error handling is omitted from the flowcharts in order to focus on key aspects. A thread synchronization scheme (e.g. semaphore use) is assumed where appropriate. Flowchart processing is intended to be interpreted in the broadest sense by example, and not for limiting methods of accomplishing the same functionality. Disclosed user interface processing and/or screenshots are also preferred embodiment examples that can be implemented in various ways without departing from the spirit and scope of this disclosure. Alternative user interfaces (since this disclosure is not to be limiting) will use similar mechanisms, but may use different mechanisms without departing from the spirit and scope of this disclosure. Novel features disclosed herein need not be provided as all or none. Certain features may be isolated in some embodiments, or may appear as any subset of features and functionality in other embodiments.

Figure 1:
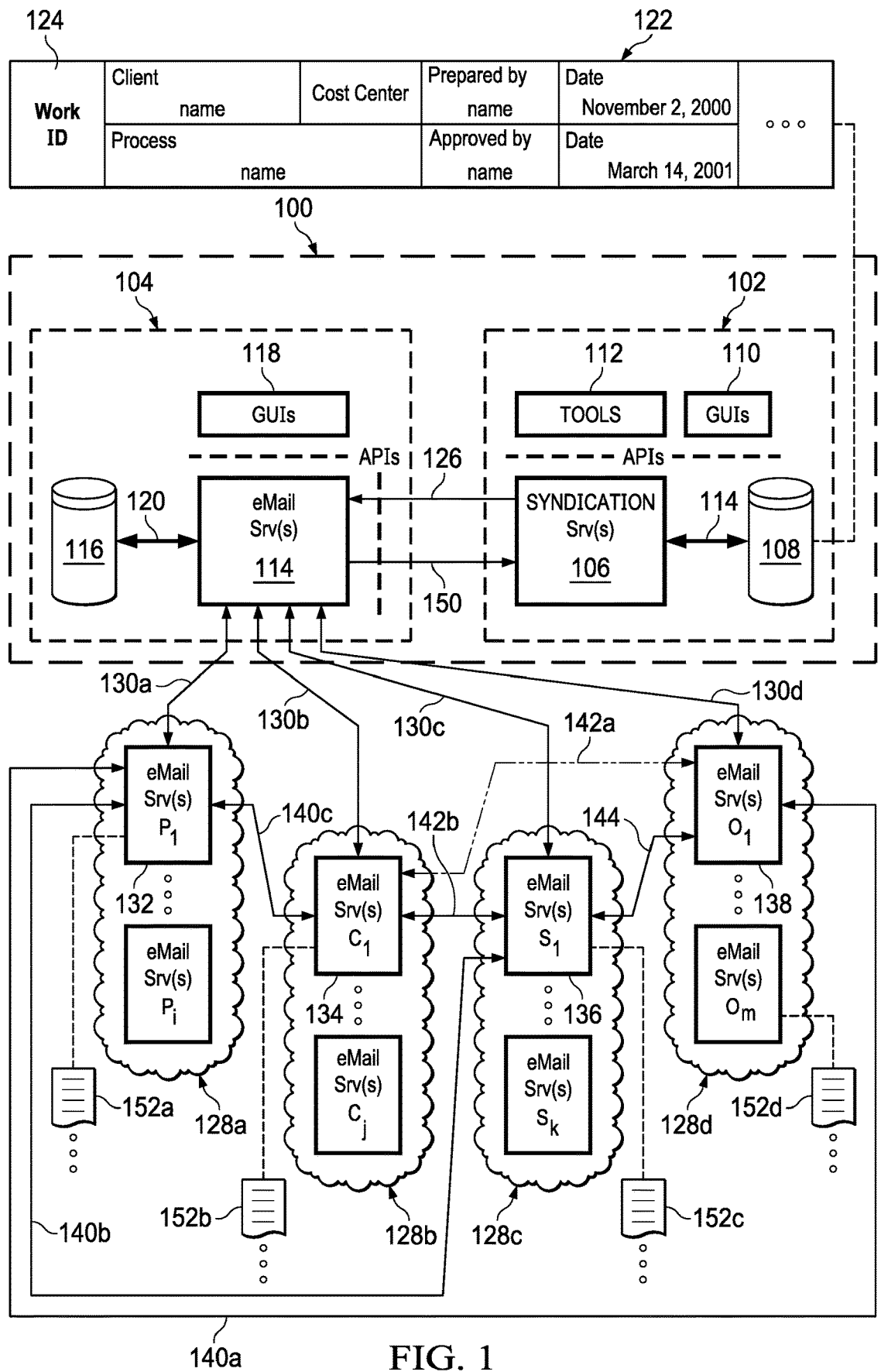
FIG. 1 depicts an overall processing architecture of a preferred embodiment of the present disclosure.

FIG. 1 depicts an overall processing architecture of a preferred embodiment of the present disclosure. An owner's footprint of the system and method disclosed herein is illustrated regardless of whether maintained to a cloud platform or on premise. That footprint, referred to as syndication service environment 100, includes syndication service wares 102 and associated eMail service wares 104. Syndication service wares 102 includes at least one syndication server 106, syndication service Data Warehouse (DW) 108, syndication service Graphical Use Interfaces (GUIs) 110, and syndication service tools 112. Server(s) 106 may also be referred to as service(s) 106 depending on the reader's point of view (hardware or software). Data Warehouse (DW) 108 preferably comprises at least one SQL database with a plurality of tables and other schema with appropriate constraints. Other data forms may be used, or combinations thereof. DW 108 may be connected by way of direct access, Storage Area Network (SAN) access, cloud based access, or a variety of other methods over connection 114. GUIs 110 and tools 112 preferably access service(s) 106 or DW 108 through applicable Application Programming Interfaces (APIs), but other methods may be deployed. Critical to service(s) 106 is wares 104 containing at least one eMail server 114, eMail data 116, and eMail Graphical Use Interfaces (GUIs) 118. Server(s) 114 may also be referred to as service(s) 114 depending on the reader's point of view (hardware or software). Data 116 may be embodied in SQL database form as described above, or may take on a variety of suitable forms or combinations thereof, depending on the particular eMail system wares 104. Data 116 may be connected by way of direct access, Storage Area Network (SAN) access, cloud based access, or a variety of other methods over connection 120. GUIs 118 preferably access service(s) 114 through applicable Application Programming Interfaces (APIs), but other methods may be deployed. Any of the GUIs 110 and 118 may be accessed at an appropriate data processing system 300 (not shown), for example a client device as described above.

Some DW data 108 and data 116 may be multi-part fields (i.e. have sub-fields), fixed length records, varying length records, or a combination with field(s) in one form or the other. Some data embodiments will use anticipated fixed length record positions for subfields that can contain useful data, or a null value (e.g. −1). Other data embodiments may use varying length fields depending on the number of sub-fields to be populated. Other data embodiments will use varying length fields and/or sub-fields which have tags indicating their presence. Other data embodiments will define additional fields to prevent putting more than one accessible data item in one field. In any case, processing will have means for knowing whether a value is present or not, and for which field (or sub-field) it is present. Absence in data may be indicated with a null indicator (−1), or indicated with its lack of being there (e.g. varying length record embodiments). Of course, SQL data embodiments provide convenient methods for storing and accessing data.

Assuming an applicable business enterprise has been on-boarded into DW 108 (see discussions for FIGS. 4A through 4C), a user of GUIs 110*s* may initiate a business process activity action embodied by an Activity Data Record (ADR) 122 maintained in DW 108. Data records in DW 108, for example ADR 122, typically contain a plurality of fields joined together from a plurality of SQL tables using appropriate joining information. A WID becomes key in joining information of a plurality of physical records in the DW 108. ADR 122 describes a collection of data for the activity which has already been assigned a WID 124. Once the WID 124 is generated, data associated with the activity is updated with the WID to facilitate joining needed data for the WID. There may be many active Work Identifiers (WIDs) and associated data in DW 108 at any time, thereby reflecting pending activities in progress for a plurality of business partners and/or a plurality of business assets, and for a plurality of business enterprises (e.g. distinct corporations). When an ADR is created, service(s) 106 manufactures an appropriate eMail embodiment of the ADR information, and interfaces to service(s) 114 for sending an outbound eMail distribution to all recipients (or contacts) determined to be associated with the particular activity described by ADR 122, preferably by way of an API invocation over connection 126. Other connection methods may be deployed. This enables people of the applicable business enterprise to use their "comfort-zone" conventional eMail system for automated collaboration with service(s) 106. The outbound eMail may contain keyword(s) as well as a WID and other information of interest to the recipient(s). eMail interfaces are not required. All activity processing may be performed through GUIs 110, however experience has shown many users prefer the convenience of their eMail system.

Recipients may be any of a variety such as providers (see cloud 128*a*), clients (see cloud 128*b*), syndication service operators (see cloud 128*c*), or other users (see cloud 128*d*). Clouds 128 each contain some population of user types perhaps from different business enterprises and perhaps in vastly different geographical locations. There may be many different types of eMail servers supporting these different users of the same type, for example as shown for eMail server(s) (or service(s)) $P_1$ through $P_i$ supporting providers (e.g. business partners of particular clients), eMail server(s) (or service(s)) $C_1$ through $C_j$ supporting clients (i.e. paying customers of the syndication services across a plurality of business enterprises), eMail server(s) (or service(s)) $S_1$ through $S_k$ supporting syndication service operators (i.e. people employed by the owner of the syndication services solution disclosed herein), and eMail server(s) (or service(s)) $O_1$ through $O_m$ supporting other users.

Continuing with the outbound eMail example, service(s) 114 sends outbound the WID tagged eMail distribution to all recipients, for example over connections 130. A provider user of eMail server 132 may act on the eMail, perhaps after editing it, adding data to it, or adding an attachment, thereby causing it to be sent outbound over connections 140 as well over connection 130*a*. When sent back over connection 130*a*, service(s) 106 will subsequently retrieve the eMail over connection 150 for processing it and updating data in DW 108, for example associated to ADR 122. ADR 122 will always contain the supervisory state of data for the activity over time from all recipients and activity actions associated with ADR 122. Similarly, a client user of eMail service(s) 134 may act on the original eMail distribution from service(s) 106 described above, or a subsequent eMail sent from service(s) 132.

In fact, there may be many subsequent eMail distributions sent outbound from service(s) 132, 134, 136 and 138 as the result of the one original eMail distribution sent over connection 126 described above, or as a result of the many types of users that may have acted on a related WID 124 associated subsequent distribution sent by some other user. Regardless of who sends a distribution, the special predefined recipient for service(s) 106 is always copied to ensure DW 108 contains the supervisory state of affairs between all users over time for the particular activity correlated using WID 124. Similarly, a user of service(s) 134 can send outbound eMail over connections 142, 140*c* and 130*b*. Similarly, a user of service(s) 136 can send outbound eMail over connections 144, 140*b*, 142*b* and 130*c*. Similarly, a user of service(s) 138 can send outbound eMail over connections 130*d*, 140*a*, 142*a*, and 144. Again, the special predefined recipient for service(s) 106 is always copied to ensure DW 108 contains the supervisory state of affairs between all users over time for the particular activity correlated using WID 124, as accessed over connection 150. Depending on all activity responses (e.g. REPLYs to eMail), eMail up-to-date format embodiments 152 will contain the customary trail of history between recipients because service(s) 106 continues sending outbound eMail items over connection 126 to keep all applicable users current with status and activity responses by all users. ADR 122 is kept up to date to incorporate all activity actions from all users up to a particular point in time. Thus, users not wanting to solely use GUIs 110 can rely on their applicable eMail service(s). eMail obtained over connection 150 always contains the WID 124 for properly associating other eMail contained information into DW 108 for ADR 122, for example information added or updated by a user. Keywords may also be provided in those eMail items as used by particular users to cause desirable updates to DW 108.

Connections 114, 120, 126, 150, 130, 140, 142, 144 and any other communications connections herein may span large geographical distances, for example over an Internet topology. The large distances may also involve a variety or protocols, telephony embodiments, switches, hubs, router configurations, or the like to get data from one place to another, as well known to those skilled in the art. Bidirectional connections (i.e. arrows at both ends) have been shown for simplicity, when in fact some preferred embodiments may actually use separate unidirectional communications paths over unique topologies of software and hardware to accomplish a communications path.

Figure 2A:
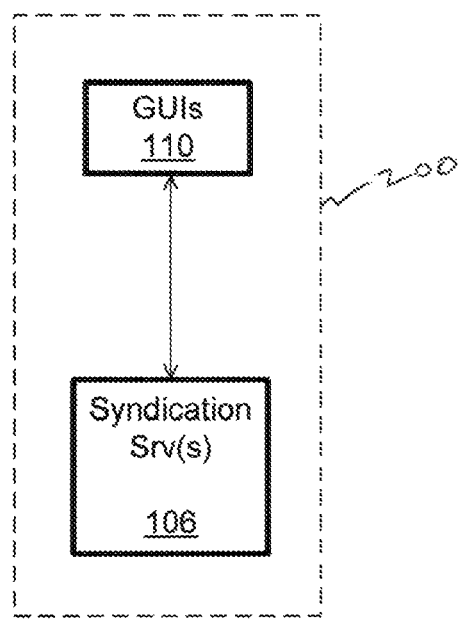
FIGS. 2A and 2B each depict a block diagram useful for describing user interfaces to various services or servers of the present disclosure.
Figure 2B:
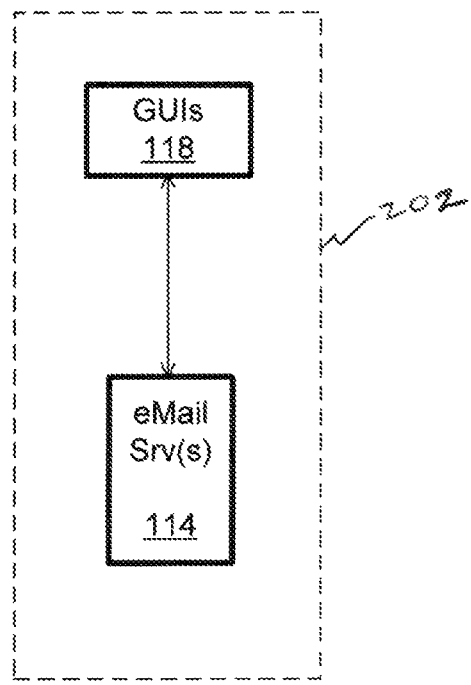

FIGS. 2A and 2B each depict a block diagram useful for describing user interfaces to various services or servers of the present disclosure. GUIs 110 programmatically access service(s) 106 so a user interfacing to GUIs 110 can carry out desired business activity interaction with service(s) 106, for example to initiate a business activity action processing described herein. GUIs 118 programmatically access service (s) 114 so a user interfacing to GUIs 118 can carry out desired business activity interaction with service(s) 114, for example to initiate an eMail action described herein.

Figure 2C:
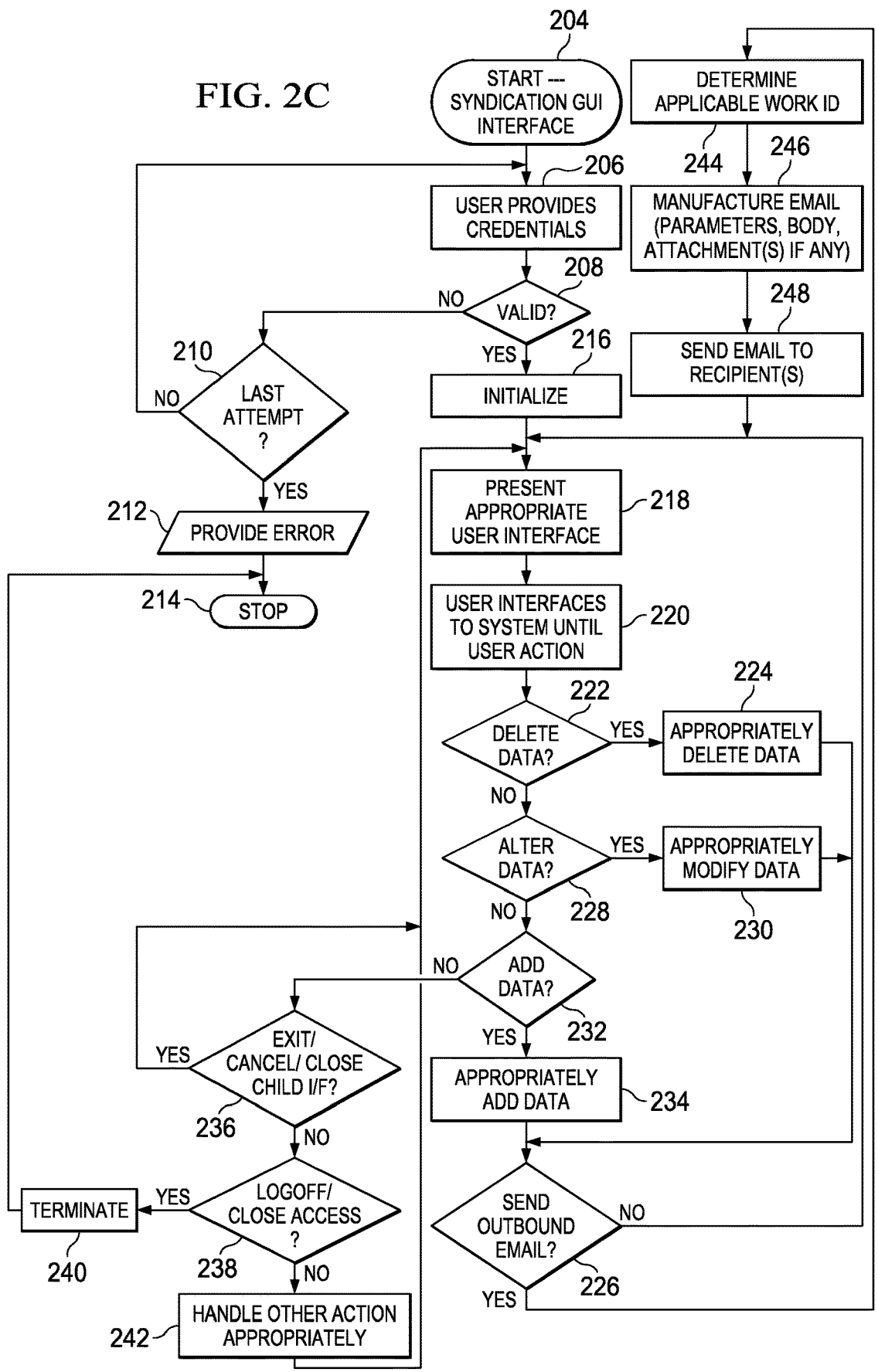
FIG. 2C depicts a flowchart for describing a preferred embodiment of detailed generic syndication user interface processing of FIG. 2A.

With reference to FIG. 2C, depicted is a flowchart for describing a preferred embodiment of detailed generic syndication user interface processing 200 of FIG. 2A. The broadness of business applications and unusual detailed depth of data involved in those applications are conveniently gleaned with generic processing 200 which begins at block 204 and continues to block 206 where the user logs into service(s) 106 through GUI 110 with credentials (e.g. user id and password). Thereafter, if block 208 determines the credentials entered are not valid upon checking with authentication credentials of DW 108, block 210 checks if the user exhausted a reasonable number of attempts, in which case an error is provided at block 212 and processing 200 terminates at block 214. If block 210 determines the user did not exhaust an allocated number of attempts, processing continues back to block 206 where credentials can be correctly entered by the user.

If block 208 determines credentials entered are valid, then processing 200 continues to block 216 to initialize GUIs 110 for subsequent processing, block 218 for presenting an appropriate user interface (e.g. main menu if first time here from block 204), and the user interfaces with GUIs 110 at block 220 until a user action is detected of interest for processing 200. When a user action of interest is determined, processing leaves block 220 for block 222.

If block 222 determines the user selected to delete particular data through GUIs 110, then block 224 appropriately deletes data from DW 108 and processing continues to block 226 which is described below. If block 222 determines the user did select to delete particular data, the processing continues to block 228. If block 228 determines the user selected to alter particular data through GUIs 110, then block 230 appropriately modifies data in DW 108 and processing continues to block 226. If block 228 determines the user did not select to alter particular data, the processing continues to block 232. If block 232 determines the user selected to add particular data through GUIs 110, then block 234 appropriately adds the user specified data to DW 108 and processing continues to block 226. If block 232 determines the user did not select to add particular data, the processing continues to block 236.

If block 236 determines the user selected to exit, cancel, or close a (subordinate) child user interface of GUIs 110, then processing continues back to block 218. If block 236 determines the user did not select to exit, cancel, or close a (subordinate) child user interface of GUIs 110, then processing continues to block 238. If block 238 determines the user selected to logoff from, or close access to, GUIs 110, then processing continues to block 240 where GUIs 110 are appropriately terminated and processing 200 terminates at block 214. If block 238 determines the user did not select to logoff from, or close access to, GUIs 110, then processing continues to block 242 where any other actions leaving block 220 are appropriately handled before continuing back to block 218.

Referring back to block 226, if it is determined that the user action also involves sending an outbound eMail as described for FIG. 1, then block 244 determines a WID (i.e. generates a WID if one is not created yet for the activity underway), block 246 manufactures an appropriate outbound eMail format, and block 248 sends the eMail over connection 126 as described above before continuing back to block 218. In some embodiments, block 242 may conditionally continue to block 226 processing depending on a particular user action in a particular GUIs 110 embodiment, thereby not requiring a direct action on data in DW 108 (e.g. selecting a button or other control in the user interface).

Processing 200 may be in context of an internet browser or a native client-side application. All user types may use processing 200.

FIG. 2D depicts a flowchart for describing a preferred embodiment of detailed generic eMail user interface processing 202 of FIG. 2B. The broadness of business applications and unusual detailed depth of data involved in those applications are conveniently gleaned with generic processing 202 which begins at block 250 and continues to block 252 to initialize GUIs 118 for subsequent processing, block 254 for presenting an appropriate user interface (e.g. main eMail user interface if first time here from block 250), and the user interfaces with GUIs 118 at block 256 until a user action is detected of interest for processing 202. When a user action of interest is determined, processing leaves block 256 for block 258.

If block 258 determines the user selected to open a syndication service originated eMail item, then processing continues to block 268 (described below), otherwise processing continues to block 260. If block 260 determines the user selected to logoff from, or close access to, GUIs 118, then processing continues to block 262 where GUIs 118 are appropriately terminated and processing 202 terminates at block 264. If block 260 determines the user did not select to logoff from, or close access to, GUIs 118, then processing continues to block 266 where any other actions leaving block 256 are appropriately handled before continuing back to block 254.

Referring back to block 268, the user interfaces through GUIs 118 to open the syndication originated eMail item and processing continues to block 270. If block 270 determines the user has completed working with the eMail item, processing continues back to block 254, otherwise processing continues to block 272. If block 272 determines the user selected to reply to the eMail item, processing continues to block 274, otherwise processing continues back to block 254. The user works (e.g. browses, edits, adds to, adds attachments, etc) with the eMail item at block 274 and processing continues to block 276. If block 276 determines the user decided to cancel working with the eMail item, processing continues back to block 254, otherwise processing continues to block 278. If block 278 determines the user selected to reply and confirm sending the eMail item, block 280 sends the eMail distribution, for example by way of connections described above (e.g. 150, 130, 140, 142, 144), otherwise processing continues back to block 274. Block 280 continues to block 254. Processing 202 may be in context of an internet browser or a native client side application. All user types may use processing 202.

Figure 2E:
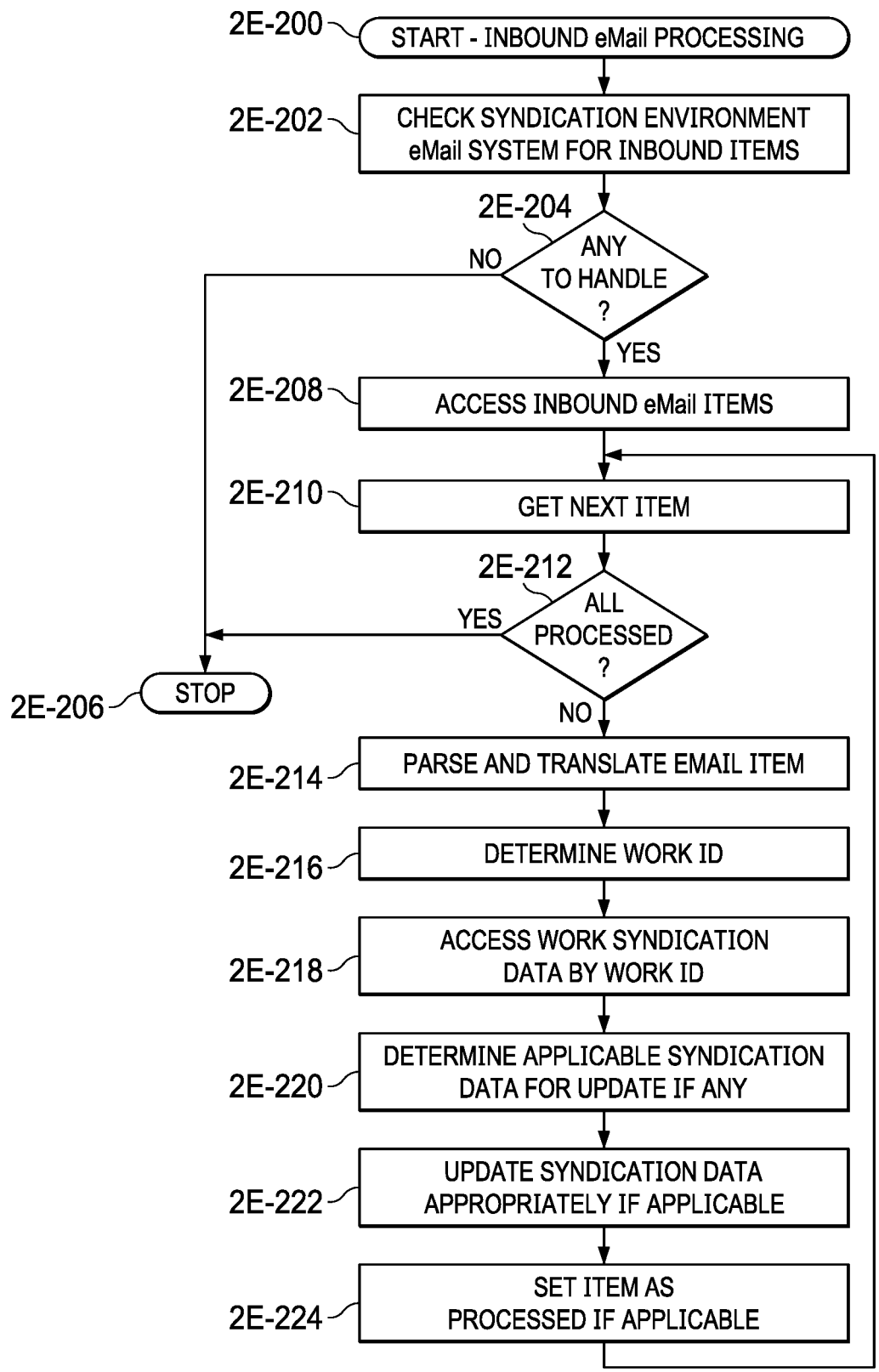
FIG. 2E depicts a flowchart for describing a preferred embodiment of detailed generic inbound eMail processing.

FIG. 2E depicts a flowchart for describing a preferred embodiment of detailed generic inbound eMail processing. The broadness of business applications and unusual detailed depth of data involved in those applications are conveniently gleaned with generic processing over connection 150 which begins at block 2E-200 and continues to block 2E-202 to check for existence of inbound eMail items (e.g. originated from service(s) 132-138). Different embodiments may use polling, a real time delivery hook when transported or routed to service(s) 114, a callback syndication service(s) 106 API invoked by service(s) callback functionality (e.g. initially setup by service(s) 106 invoking an API of service(s) 114), or some other method. Thereafter, if block 2E-204 determines one or more inbound eMail items exist for processing, block 2E-204 continues to block 2E-208, otherwise FIG. 2E processing terminates at block 2E-206. Block 2E-208 accesses the inbound eMail item(s) via a preferred embodiment just described and block 2E-210 starts an iterative loop for processing each eMail item starting with the first eMail item in the list of one or more items before continuing to block 2E-212. If block 2E-212 determines that all items have already been processed in the iterative loop, FIG. 2E processing terminates at block 2E-206, otherwise block 2E-214 parses and translates the eMail item format, block 2E-216 determines the WID present in the eMail item, block 2E-218 accesses data of DW 108 by the WID, block 2E-220 determines applicable data of DW 108 which should be updates with information of the eMail item, block 2E-222 updates data of DW 108 appropriately if applicable, block 2E-224 sets the current eMail item as having been processed (at service(s) 114 so not retrieved at subsequent instance of FIG. 2E processing), and block 2E-210 gets the next eMail item for the next loop iteration of processing. In some embodiments, no block 2E-224 is necessary since retrieving by FIG. 2E designates as having already processed the eMail item for preventing duplicate processing. Any keywords and associated data may be handled by blocks 2E-220 and 2E-222.

Figure 3:
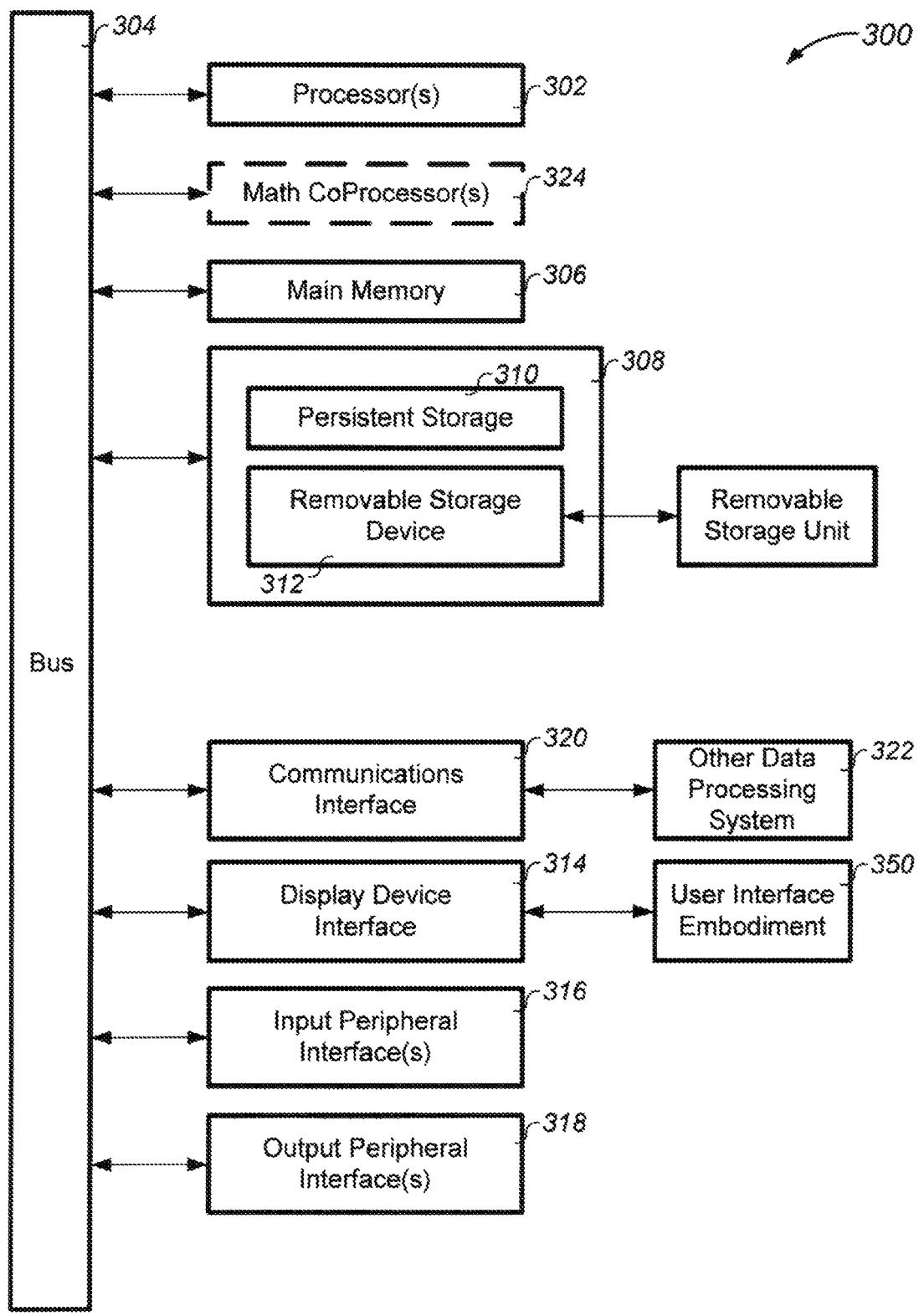
FIG. 3 depicts a block diagram of a data processing system useful for implementing any service, server, client data processing system, or other data processing systems disclosed herein.

FIG. 3 depicts a block diagram of a data processing system useful for implementing any service, server, client data processing system, or other data processing systems disclosed herein. A device or system (e.g. a mobile data processing system) accessing any GUI of the present disclosure may be a data processing system 300. A server of the present disclosure may be a data processing system 300. Any other disclosed data processing system of the present disclosure may be a data processing system 300. A data processing system 300 includes at least one processor 302 (e.g. Central Processing Unit (CPU)) coupled to a bus 304. Bus 304 may include a switch, or may in fact be a switch 304 to provide dedicated connectivity between components of data processing system 300. Bus (and/or switch) 304 is a preferred embodiment coupling interface between data processing system 300 components. The data processing system 300 also includes main memory 306, for example, random access memory (RAM). Memory 306 may include multiple memory cards, types, interfaces, and/or technologies. The data processing system 300 may include secondary storage devices 308 such as persistent storage 310, and/or removable storage device 312, for example as a compact disk, floppy diskette, USB flash, or the like, also connected to bus (or switch) 304. In some embodiments, persistent storage devices could be remote to the data processing system 300 and coupled through an appropriate communications interface. Persistent storage 310 may include flash memory, disk drive memory, magnetic, charged, or bubble storage, and/or multiple interfaces and/or technologies, perhaps in software interface form of variables, a database, shared memory, etc.

The data processing system 300 may also include a display device interface 314 for driving a connected display device (not shown) and user interface embodiment 350. The data processing system 300 may further include one or more input peripheral interface(s) 316 to input devices such as a keyboard, keypad, Personal Digital Assistant (PDA) writing implements, touch interfaces, mouse, voice interface, or the like. User input ("user input", "user events" and "user actions" used interchangeably) to the data processing system are inputs accepted by the input peripheral interface(s) 316. The data processing system 300 may still further include one or more output peripheral interface(s) 318 to output devices such as a printer, facsimile device, or the like. Output peripherals may also be available via an appropriate interface.

Data processing system 300 will include communications interface(s) 320 for communicating to another data processing system 322 via analog signal waves, digital signal waves, infrared proximity, copper wire, optical fiber, or other wave spectrums described herein. A data processing system 300 may have multiple communications interfaces 320 (e.g. cellular connectivity, 802.x, LAN/MAN/WAN interface, etc). Other data processing system 322 may be another data processing system 300, or a mobile data processing system. Other data processing system 322 may be a service.

Data processing system programs (also called control logic) may be completely inherent in the processor(s) 302 being a customized semiconductor, or may be stored in main memory 306 for execution by processor(s) 302 as the result of a read-only memory (ROM) load (not shown), or may be loaded from a secondary storage device into main memory 306 for execution by processor(s) 302. Such programs, when executed, enable the data processing system 300 to perform features of the present disclosure as discussed herein. Accordingly, such data processing system programs represent controllers of the data processing system.

In some embodiments, the disclosure is directed to a control logic program product comprising at least one processor 302 having control logic (software, firmware, hardware microcode) stored therein. The control logic, when executed by processor(s) 302, causes the processor(s) 302 to provide functions of the disclosure as described herein. In another embodiment, this disclosure is implemented primarily in hardware, for example, using a prefabricated component state machine (or multiple state machines) in a semiconductor element such as a processor 302. Furthermore, data processing system 300 may include at least one math coprocessor 324 for expedient mathematical calculations. The different embodiments for providing control logic, processor execution, processing code, executable code, semiconductor processing, software, hardware, combinations thereof, or the like, provide processing means for the present disclosure, for example as described herein, and by flowcharts.

Those skilled in the art will appreciate various modifications to the data processing system 300 without departing from the spirit and scope of this disclosure. A data processing system preferably has capability for many threads of simultaneous processing which provide control logic and/or processing. These threads can be embodied as time sliced threads of processing on a single hardware processor, multiple processors, multi-core processors, Digital Signal Processors (DSPs), or the like, or combinations thereof. Such multi-threaded processing can concurrently serve large numbers of concurrent tasks. Concurrent processing may be provided with distinct hardware processing and/or as appropriate software driven time-sliced thread processing. Those skilled in the art recognize that having multiple threads of execution is accomplished in many different ways without departing from the spirit and scope of this disclosure. This disclosure strives to deploy software to existing hardware configurations, but the disclosed software can be deployed as burned-in microcode to new hardware.

Data processing aspects of drawings/flowcharts are preferably multi-threaded so that many applicable data processing systems are interfaced with in a timely and optimal manner. Data processing system 300 may also include its own clock mechanism (not shown), if not an interface to an atomic clock or other clock mechanism, to ensure an appropriately accurate measurement of time in order to appropriately carry out processing described below. In some embodiments, Network Time Protocol (NTP) is used to keep a consistent universal time for data processing systems in communications with data processing system 300. However, appropriate time conversions are made to accommodate different data processing systems 300 in different time zones.

Figure 4A:
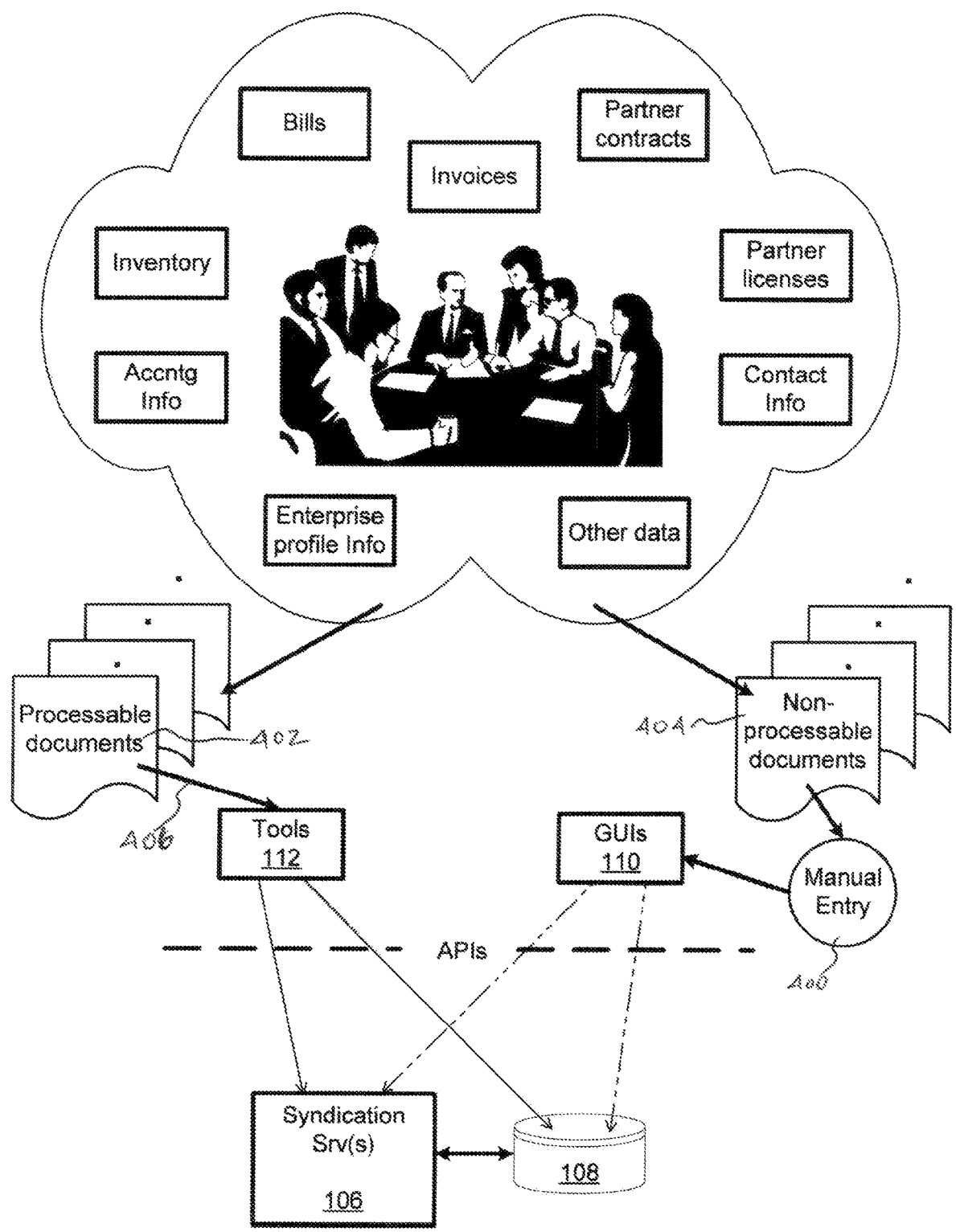
FIG. 4A depicts an illustration for describing a preferred embodiment of the on-boarding of a business enterprise into the data warehouse of the present disclosure.

FIG. 4A depicts an illustration for describing a preferred embodiment of the on-boarding of a business enterprise into the DW 108 of the present disclosure. A business enterprise with various business partners and assets have associated documents that are useful for automatically populating DW 108, thereby bringing a new client into using syndication service(s) 106. Data of interest includes enterprise profile information (e.g. cost centers, cost center names, cost center locations, organizational information, etc), accounting information, inventory information, bills, invoices, partner contracts, partner licenses, contacts information, and other data. It had been found that much of the data exists in a processable electronic form 402 for automated import to DW 108. Also, in some cases hard copy information 402 may also be automatically processed for import to DW 108. However, there may still be some non-processable information 404 required to be entered manually through GUIs 110. GUIs 110 may be used for manual data entry processing 400. Depending on import methods used, GUIs 110 may use DW 108 APIs (e.g. SQL database APIs) to import directly to DW 108, or may use service(s) 106 middleman processing to import data to DW 108. Similarly, tools 112 may include tools that use DW 108 APIs (e.g. SQL database APIs) to import directly to DW 108, or may use service(s) 106 middleman processing to import data to DW 108. Connection 406 may connect a premise installation with a remote business premise installation, may involve accessing data from a cloud platform, may involve accessing data in distant geographical locations, may be subject to authentication, and may involve a variety of topologies, software, hardware and combinations thereof as described above for other connections.

Tools 112 include a variety of useful data import tools for automating data population into DW 108. Such tools include, and are not limited to:
  Electronic file processing of a variety of sizes, formats, and originations of certain files, depending on the type of data;
  SQL database export tools to ETL (Extract, Transform, Load) required data from an enterprise database;
  Electronic data processing other than files and databases;
  OCR processing of hard copy documents with intelligent ETL capabilities;
  Intelligent scanning of hard copy documents for ETL functionality;
  Other ETL methods; or
  Combinations of any options.

Figure 4B:
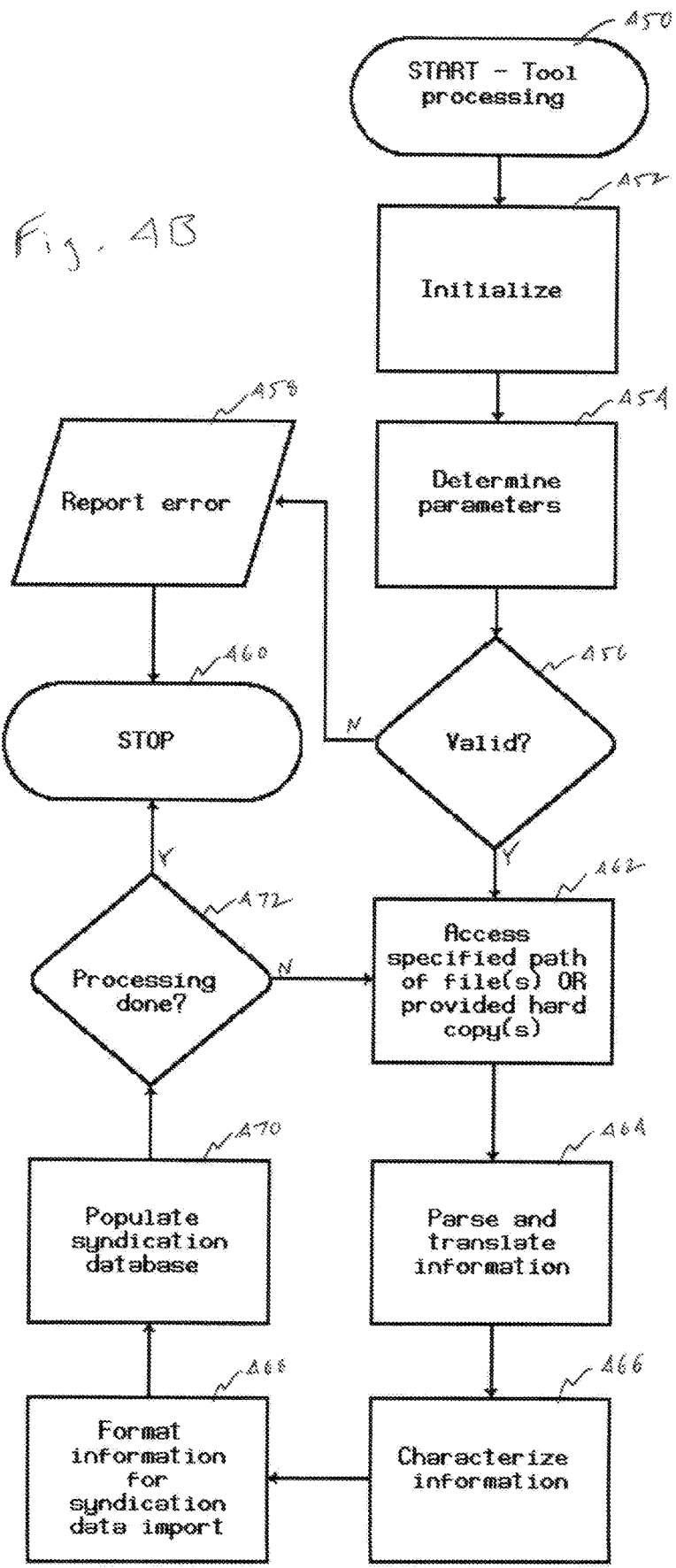
FIG. 4B depicts a flowchart for describing a preferred embodiment of detailed generic on-board tool processing of the present disclosure.

FIG. 4B depicts a flowchart for describing a preferred embodiment of detailed generic on-board tool 112 processing of the present disclosure. The broadness of business data which can be imported to DW 108 is conveniently highlighted with generic FIG. 4E processing which begins at block 450 and continues to block 452 to initialize import tool processing, block 454 for determining any specified use parameters associated with tool invocation, and then to block 456. If block 456 determines that any use parameters are invalid, processing continues to block 458 for reporting to the user error(s) found and particular tool processing terminates at block 460. If block 456 determines the parameters are all valid, then processing continues to block 462 for accessing document(s) provided to tool processing, block 464 for parsing and translating information found, block 466 for characterizing the information found, block 468 for formatting the information found for import to DW 108, block 470 for importing the data derived from information found, and block 472 for checking if import processing is complete. If block 472 determines that processing is complete, then processing terminates at block 460, otherwise processing continues back to block 462 for another iteration of processing. FIG. 2E is intentionally general to cover the import embodiments listed above.

Figures 2, 4C:
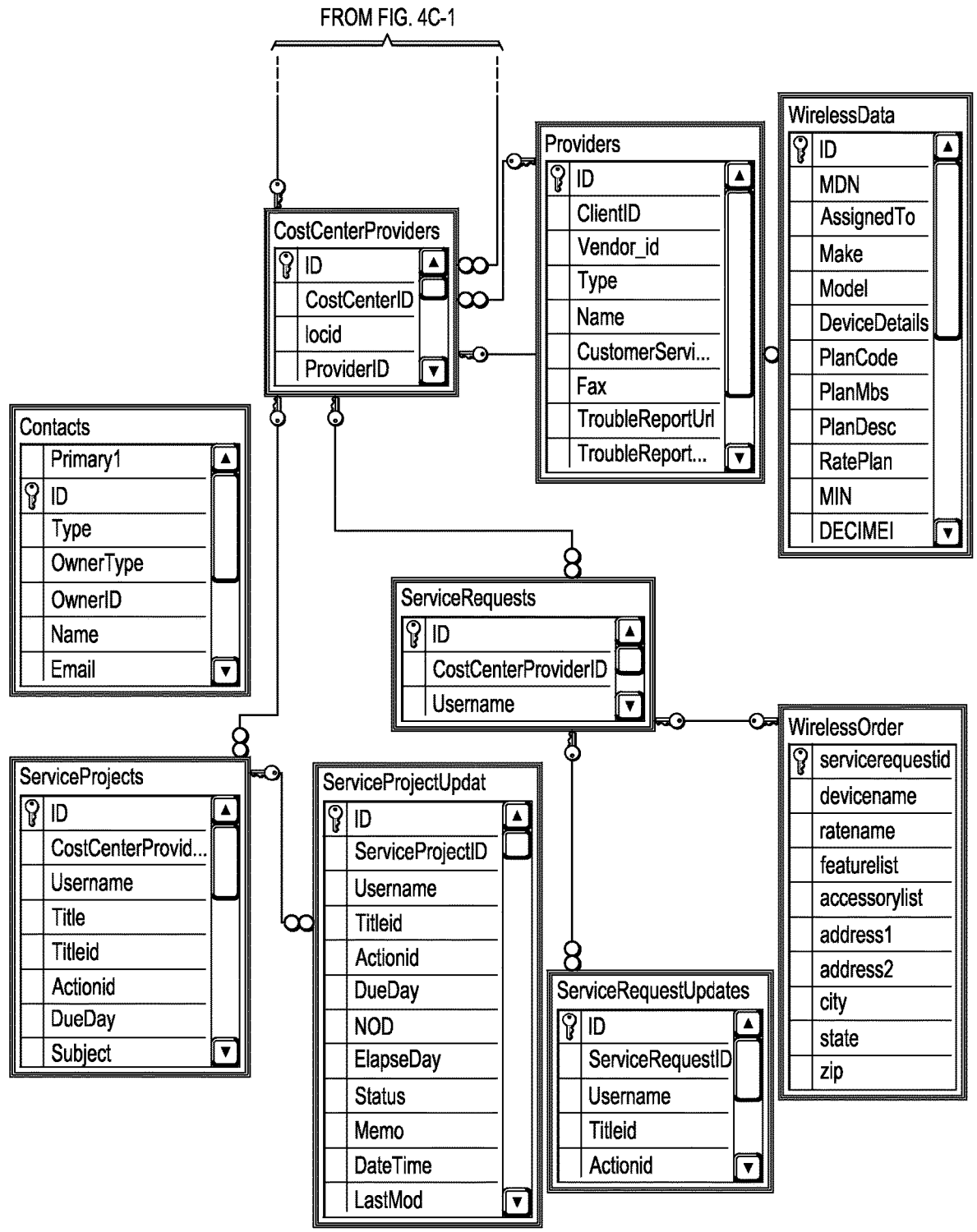
FIG. 4C depicts a preferred embodiment selected subset of data warehouse schema used to store on-boarding data for a plurality of business enterprises.

FIG. 4C depicts a preferred embodiment selected subset of DW 108 schema used to store on-boarding data for a plurality of business enterprises, for example as imported by processing of FIGS. 4A and 4B. Those skilled in the art will appreciate the schema depicted in light of discussion heretofore. FIG. 4C is an example of generic schema for a plurality of business enterprises and their different types of applications supported. Specific data gets imported as discussed above into the table schema described before syndication service(s) 106 processing is enabled.

To facilitate discussion of the present disclosure processing of interest, an ordering process is exemplified for further explanation of the generic flowcharts described. Data has already been imported to populate the schema of FIG. 4C. With reference now to FIG. 5, an order flow is presented.

Figure 5A:
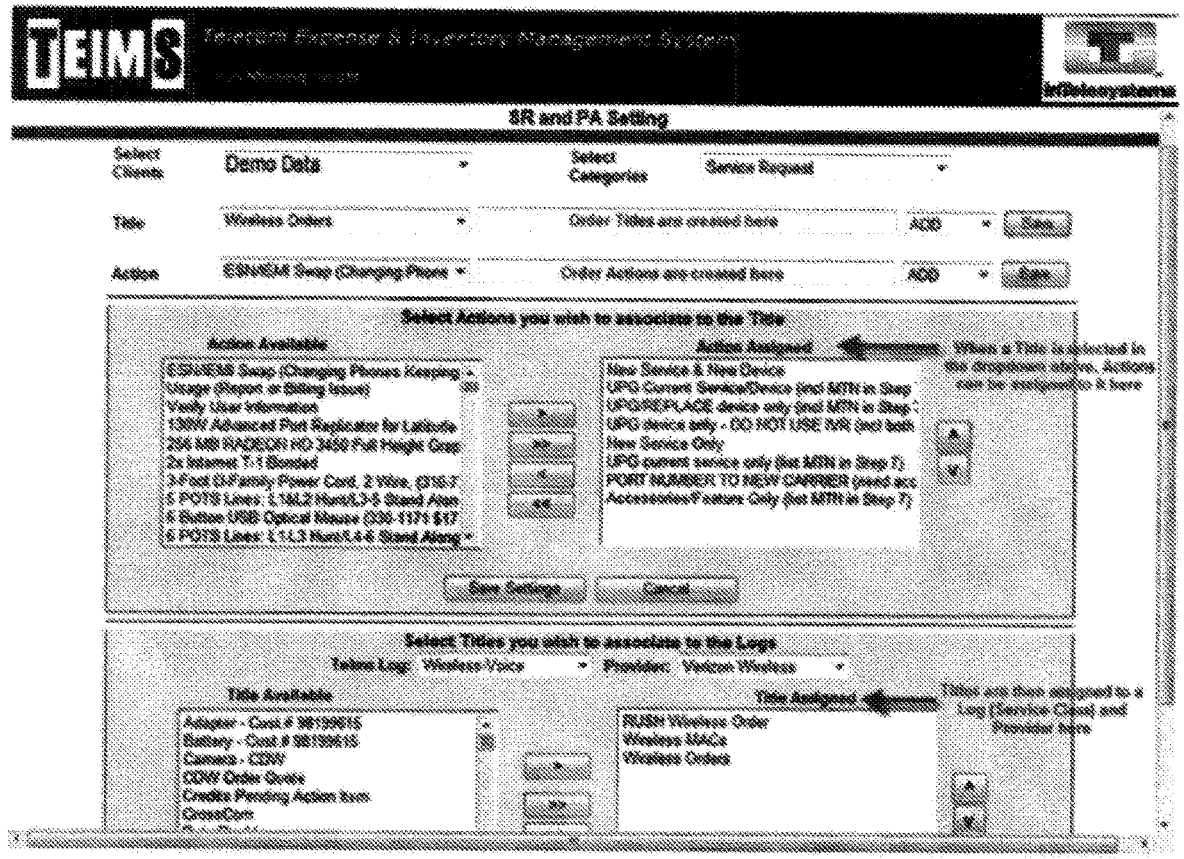
FIGS. 5A and 5B each depict Graphical User Interface (GUI) screenshots, or an explanatory portion thereof, for a preferred embodiment of managing order titles and actions involved in an ordering process example use of the present disclosure.
Figure 5B:
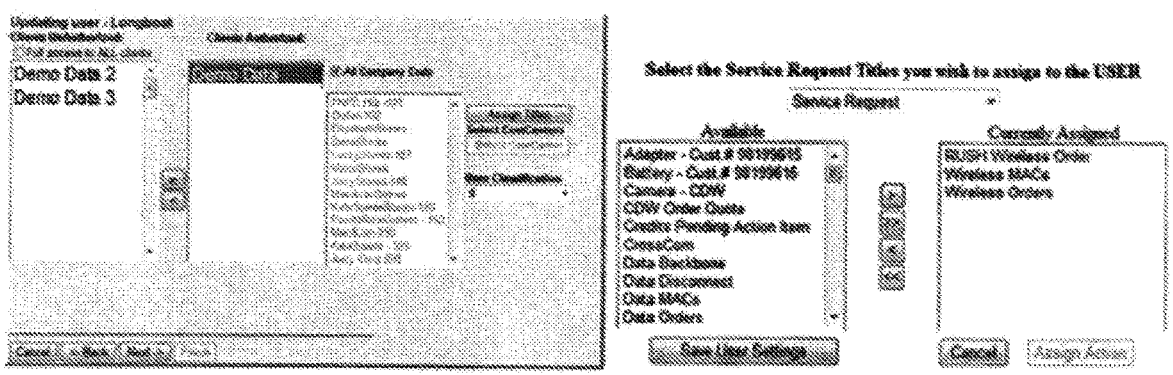

FIGS. 5A and 5B each depict Graphical User Interface (GUI) screenshots, or an explanatory portion thereof, for a preferred embodiment of managing order titles and actions involved in an ordering process example use of the present disclosure. On the SR (i.e. Service Request) and PA (i.e. Project Action) Settings page of FIG. 5A, Order Titles and Actions can be created and edited. Actions are assigned to Titles, and Titles are assigned to Log (type of service) and Provider combinations. In FIG. 5B, Titles and Actions are assigned to User Profiles, along with access to specific Clients, Cost Centers and Providers. A User can only place orders for the Clients, Titles, Actions, Cost Centers and Providers for which they have access.

Figures 5C, 5D, 5E, 5F:
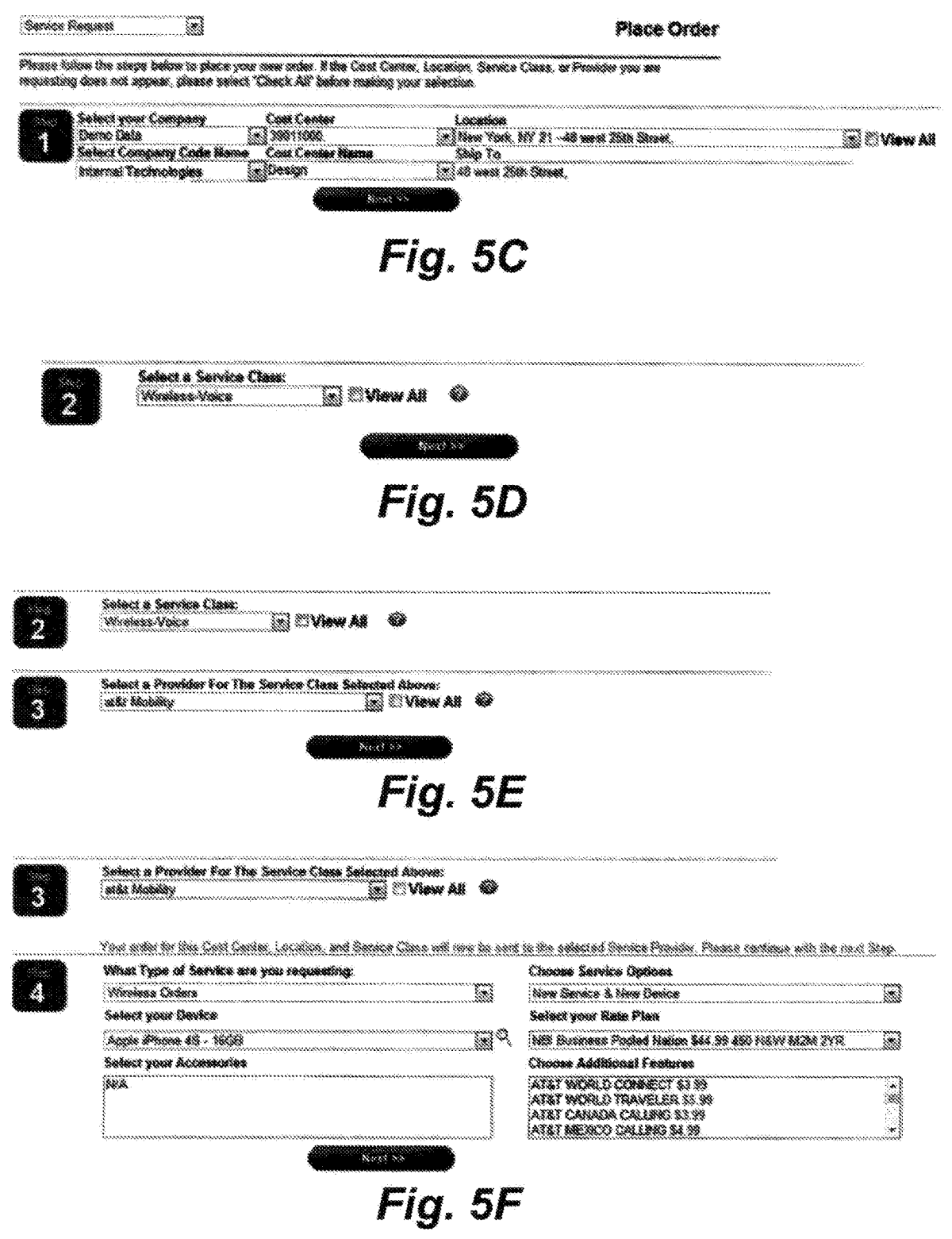

FIGS. 5C through 5N each depict Graphical User Interface (GUI) screenshots, or an explanatory portion thereof, for a preferred embodiment of place order processing in an ordering process example use of the present disclosure. The FIG. 5C first step of the Place Order process requires the User to select the Company (Client), Company Code (if applicable), Cost Center, and Location for which the order is being placed. When the new account (and billing) associated with the services ordered is created, this information will be assigned to the account for all reporting and inventory reports. In FIG. 5D Step 2, the Service Class (Log) is selected. Options available will show any Service Class currently assigned to the Cost Center/Location combination selected in Step 1. If the Service Class required for the order is not shown, "View All" can be selected. In FIG. 5E Step 3, the Provider is selected. Options available will show any Provider currently assigned to the Cost Center/Location/Service Class combination selected in Step 1 and 2. If the Provider required for the order is not shown, View All can be selected. In FIG. 5F Step 4, the order options are selected. The Type of Service (Order Title) selected drives the Service Options (Order Actions) available, which were assigned in the SR and PA Settings. The Device selected drives the Rate Plans available. Accessories and Additional Features can also be selected in this Step.

Figures 5G, 5H, 5J, 5K:
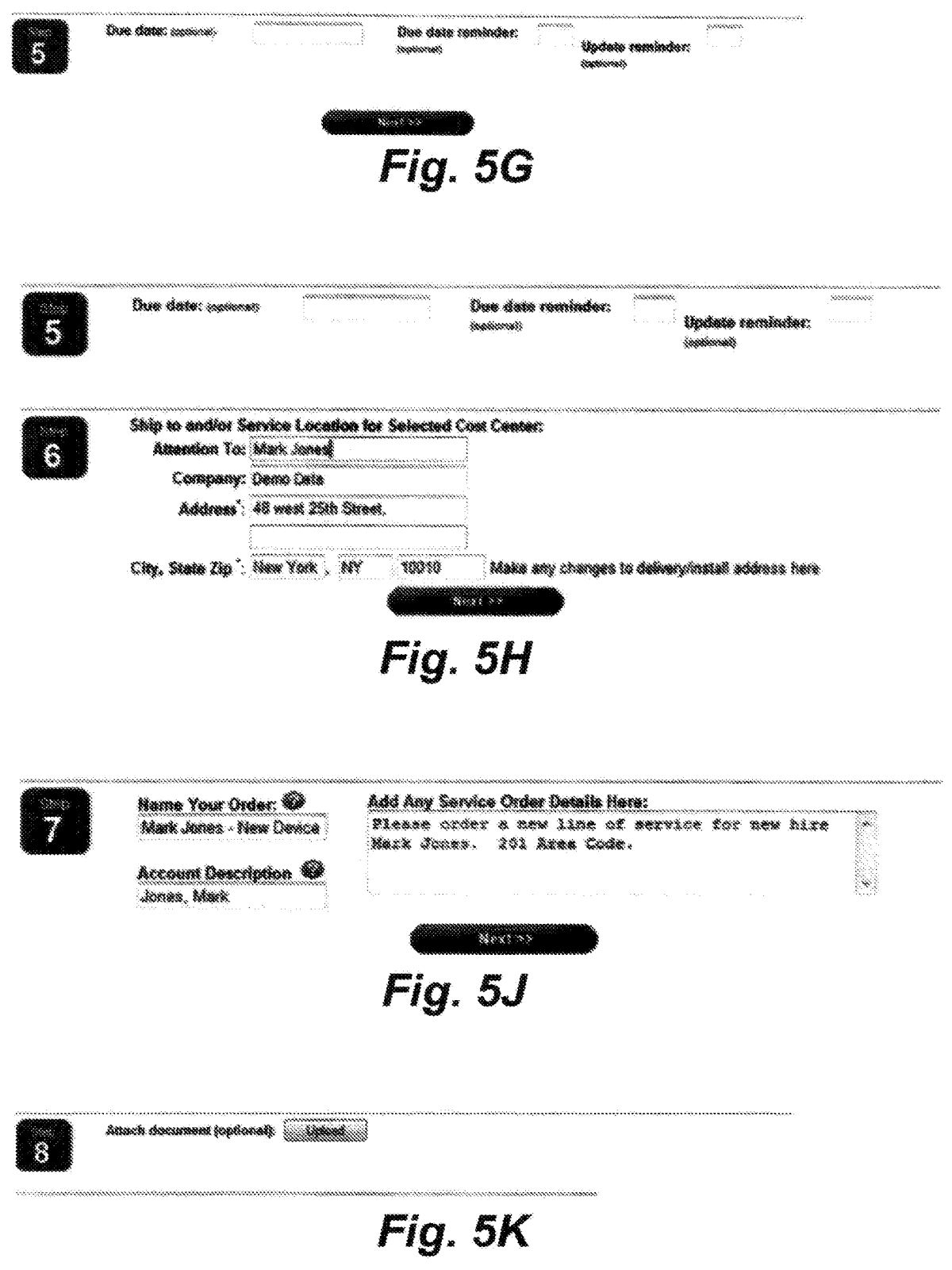

In FIG. 5G Step 5, a Due Date for the Order can be assigned. If a Due Date is assigned, a Due Data Reminder can be entered. Due Date Reminders will send an auto-update for the Order the set number of days prior to Due Date entered in this field. Update Reminders send an auto-update if the order has not been updated after the designated number of days. These Fields are optional. Note a 24-hour notice is automatically generated for any Order not updated within 24 hours of Order creation. In FIG. 5H Step 6, the Ship To address is assigned. This will reflect the Location selected in Step 1. This is a free form field, and can be manually changed to reflect the address required for the given Order. In FIG. 5J Step 7, the Name of the Order, Description and any additional comments are entered. Information entered into the "Name Your Order" field will appear as the Subject line of the Order eMail. The "Account Description" will appear as the Description on the Account in TEIMS for all billing and reporting. In FIG. 5K Step 8, an attachment can be uploaded. This can be an order quote, site survey, spreadsheet reflecting lines to disconnect, or any other attachment, Referring to FIG. 5L, when the View Order Recipient List option is selected, FIG. 5M shows changes can be made to the distribution list. This list will reflect all Users who have access to Orders for the Client/Company Code/Cost Center/Location/Service Class/Provider/Order Title/Order Action combination for this Order. EMail addresses assigned appear on the left. Should all eMail addresses assigned not be required, addresses can be dragged to the right side to remain on the distribution list, and addresses remaining on the left will be excluded. Additional addresses can be assigned in the box at the bottom. Clicking "Save Session" saves the changes, and returns the User to Place Order Screen. As shown in FIG. 5N, clicking "Confirm Order" takes the User to the Order Confirmation page.

Figure 5P:
FIGS. 5P and 5Q each depict Graphical User Interface (GUI) screenshots, or an explanatory portion thereof, for a preferred embodiment of confirm order processing in an ordering process example use of the present disclosure.
Figure 5Q:

FIGS. 5P and 5Q each depict Graphical User Interface (GUI) screenshots, or an explanatory portion thereof, for a preferred embodiment of confirm order processing in an ordering process example use of the present disclosure. FIG. 5P reflects all options selected in a "snap shot" view. Clicking "Make Changes" takes the User back to the Place Order screen to make updates to the Order, while clicking "Place Order" completes the order and FIG. 5Q shows generation of a WID 590 (i.e. an embodiment for a unique Order (Service Request) ID). This order ID (a WID 590 like WID 124) is reflected in the Subject line of the Order eMail, as well as all Order Reports that can be run in this particular use embodiment. It may also appear in other eMail fields or attachment(s) in other embodiments.

Figure 6A:
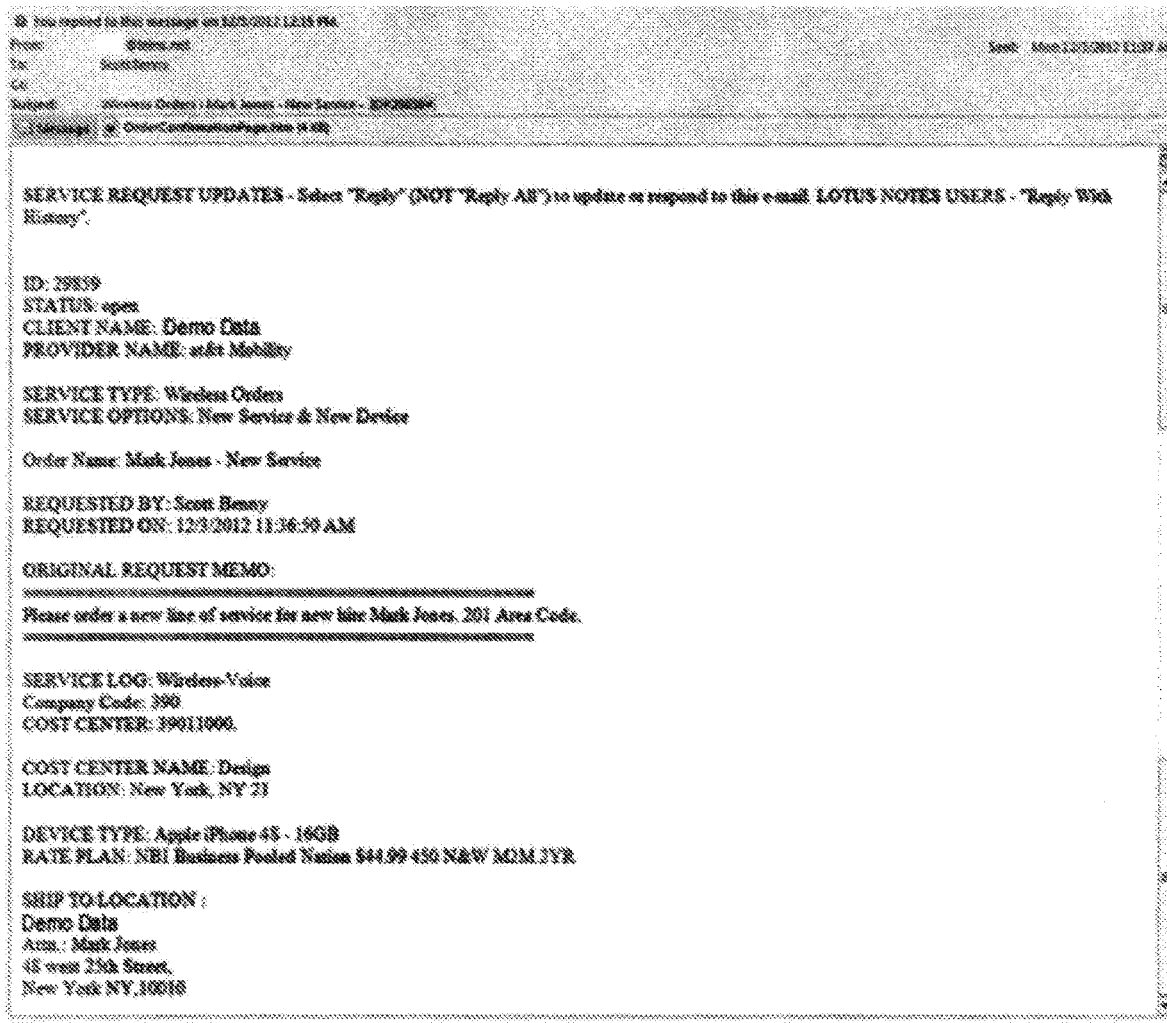
FIGS. 6A through 6C each depict Graphical User Interface (GUI) screenshots, or an explanatory portion thereof, for a preferred embodiment of order flow in eMail form associated with an ordering process example use of the present disclosure.
Figure 6B:
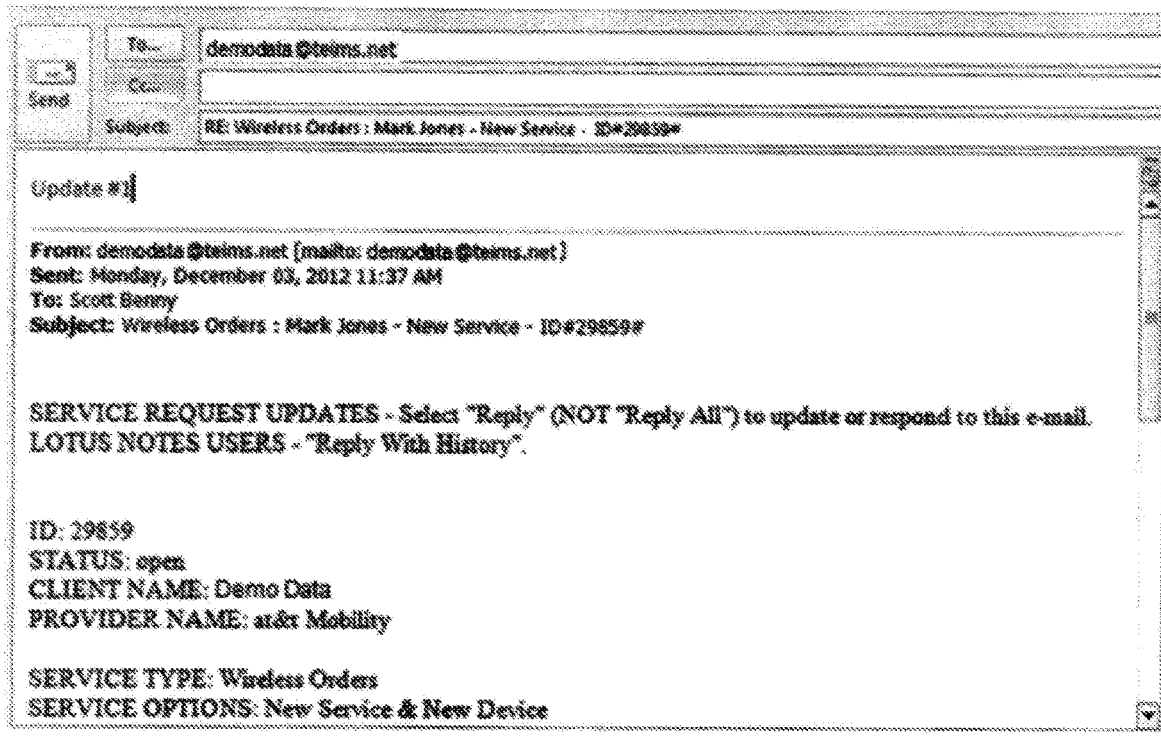
Figure 6C:
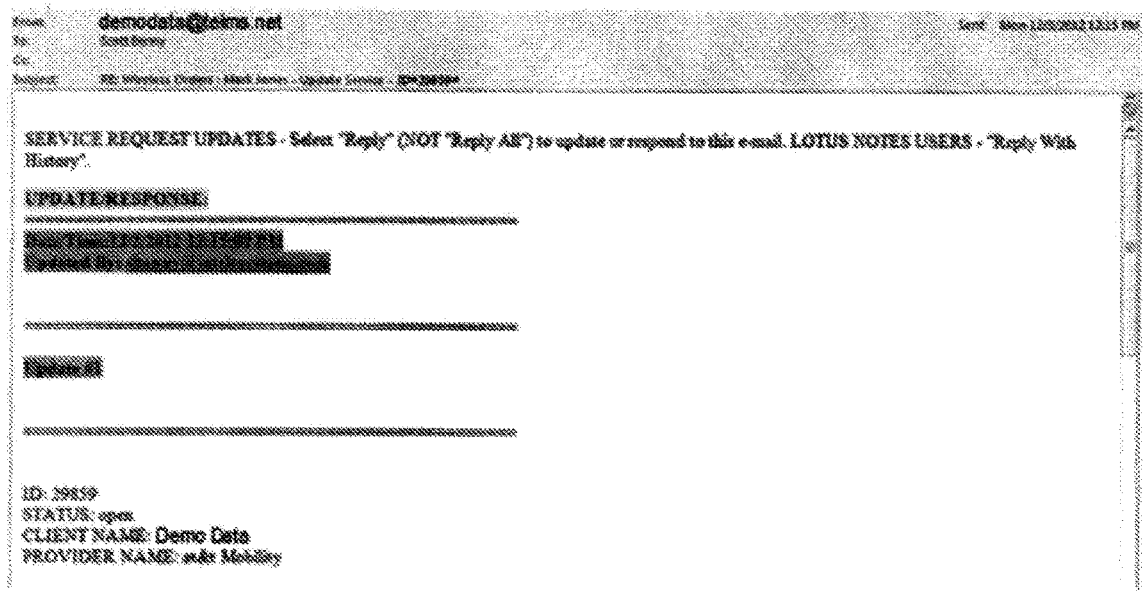
Figure 8A:
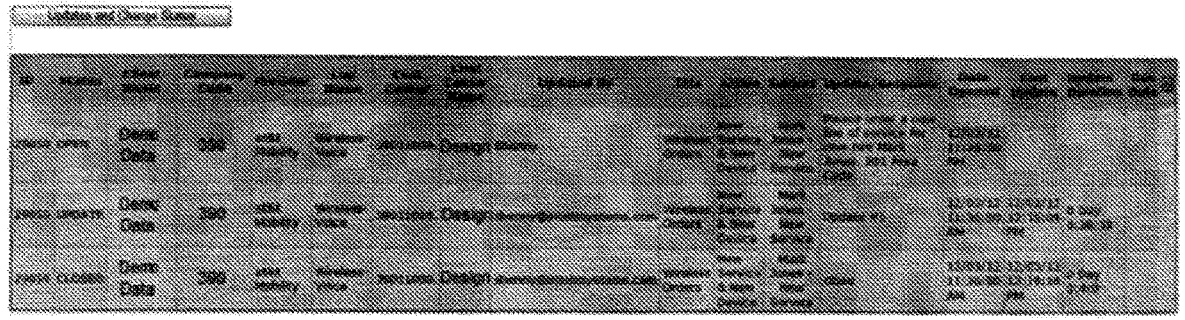
Figure 8B:
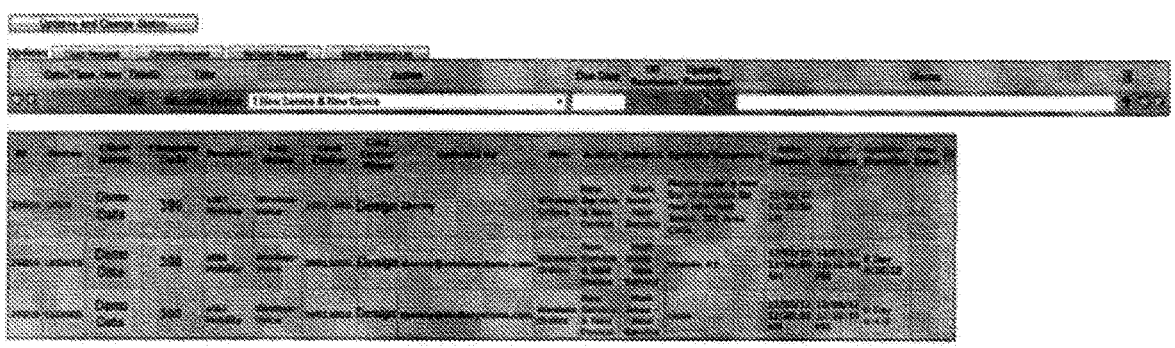
Figure 9:
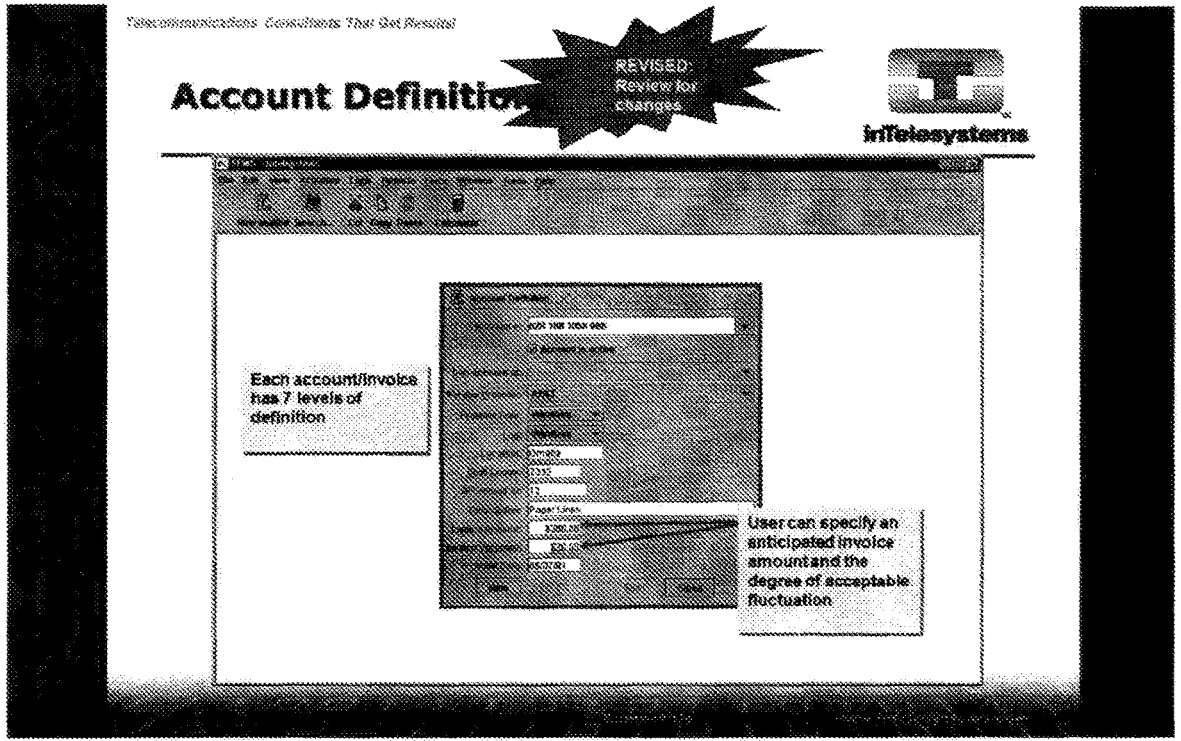
FIGS. 9 through 26 each depict Graphical User Interface (GUI) screenshots, or an explanatory portion thereof, for a preferred embodiment of relevant business process data participating in a similar manner as described in the ordering process example use of the present disclosure.
Figure 10:
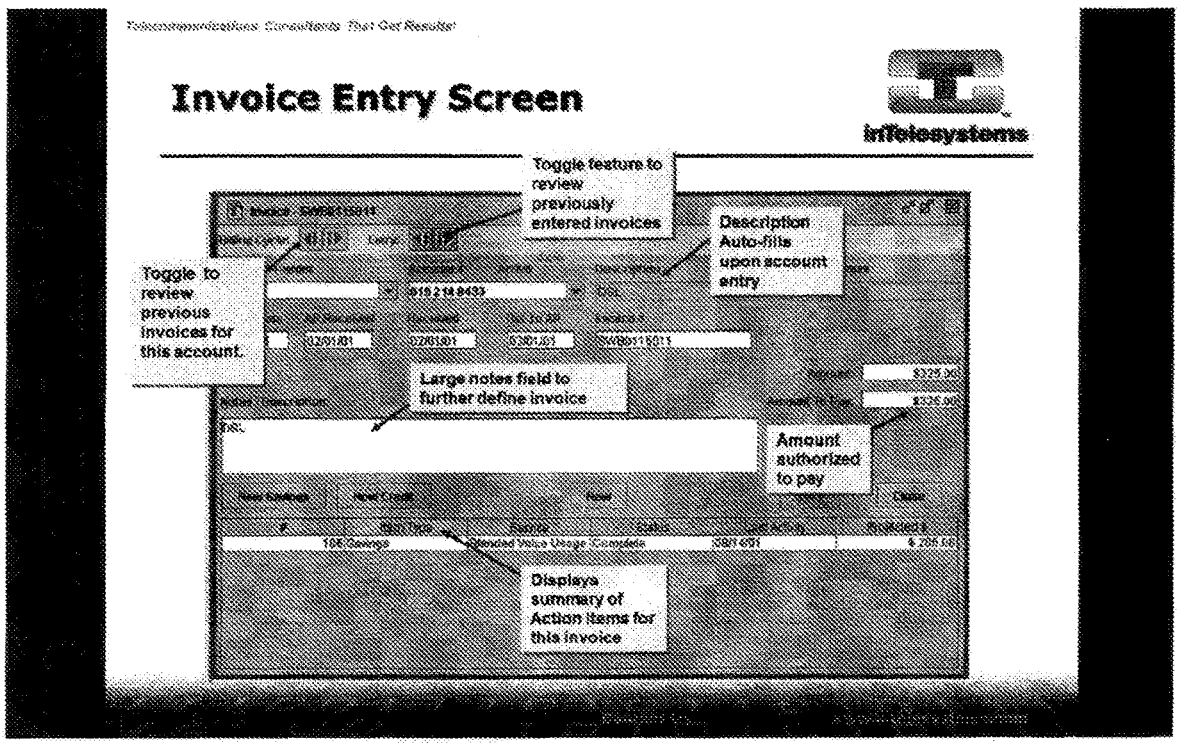
Figure 11:
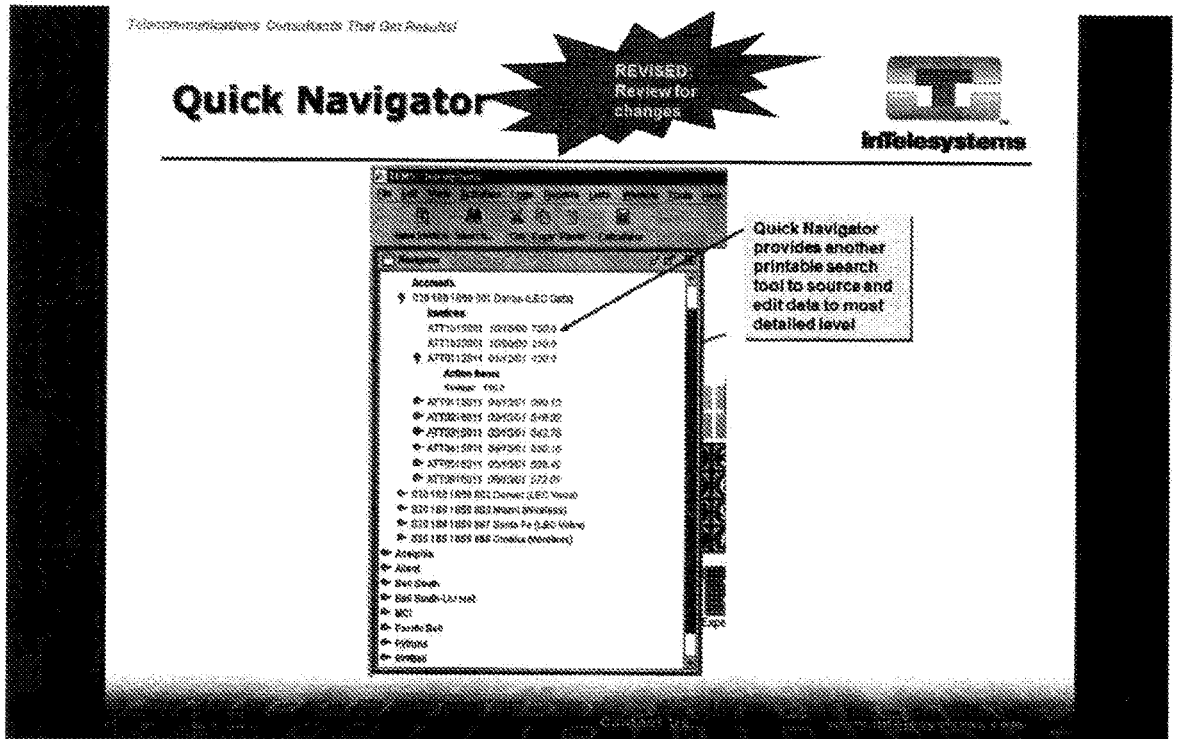
Figure 12:
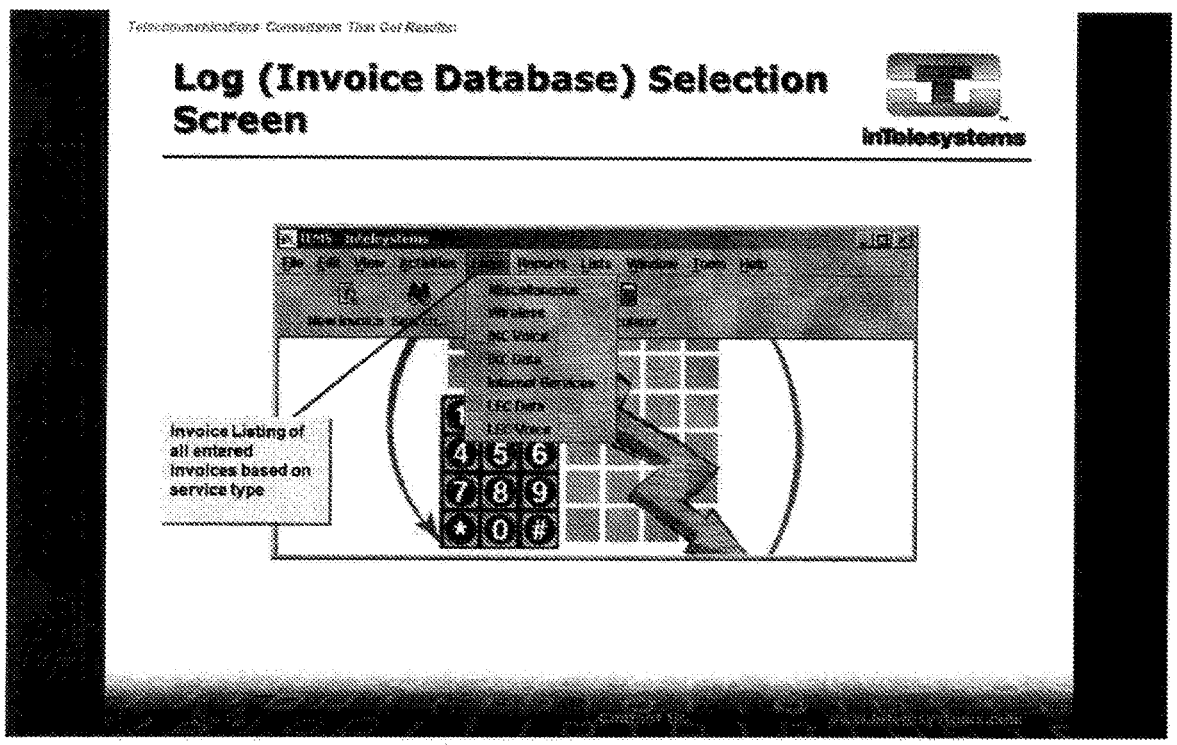
Figure 13:
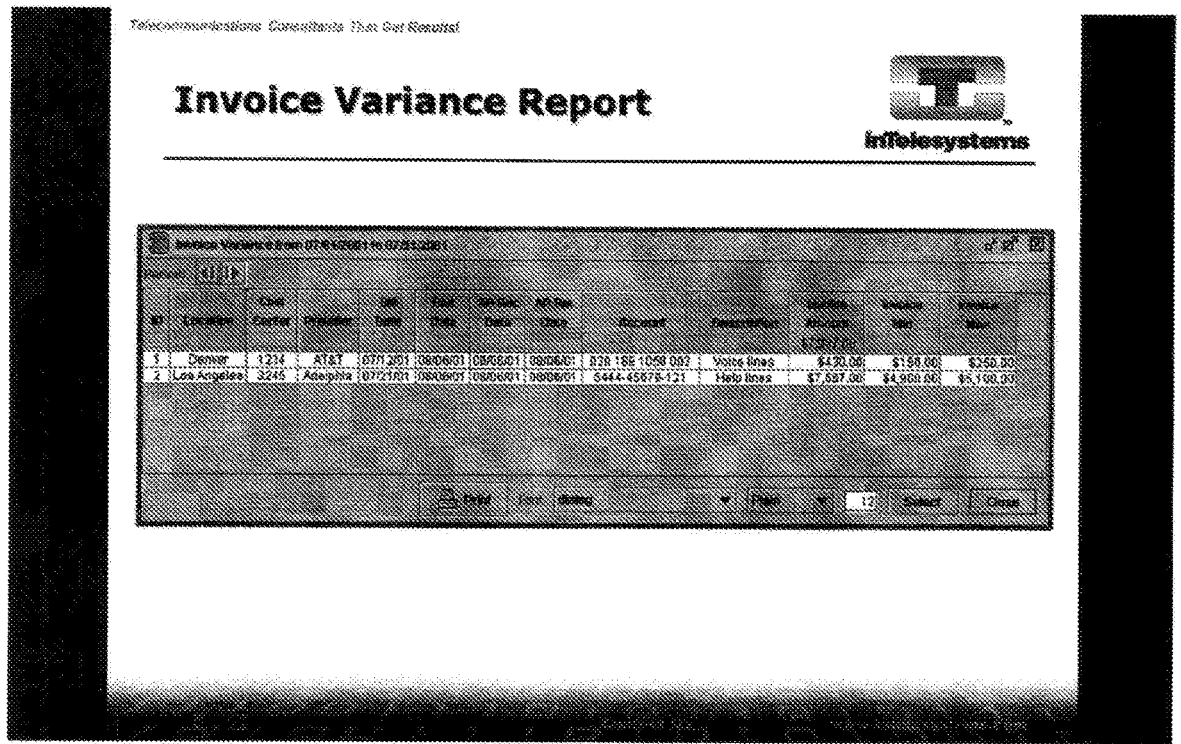
Figure 14:
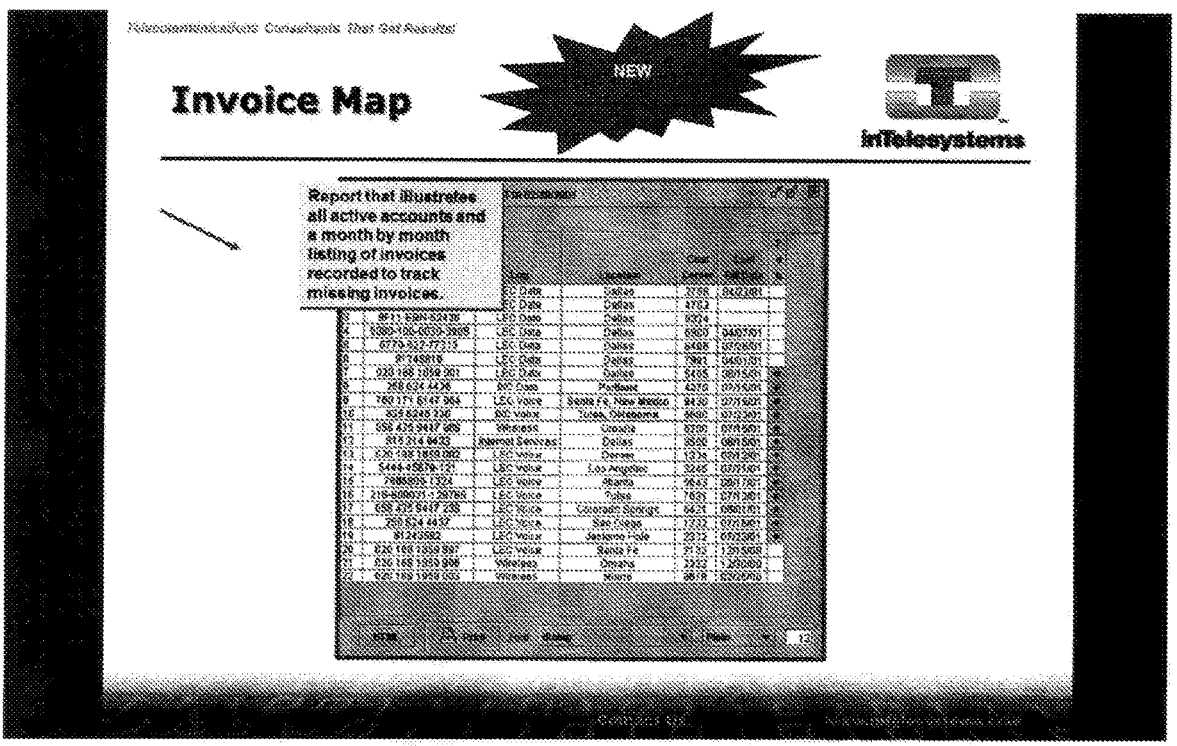
Figure 15:
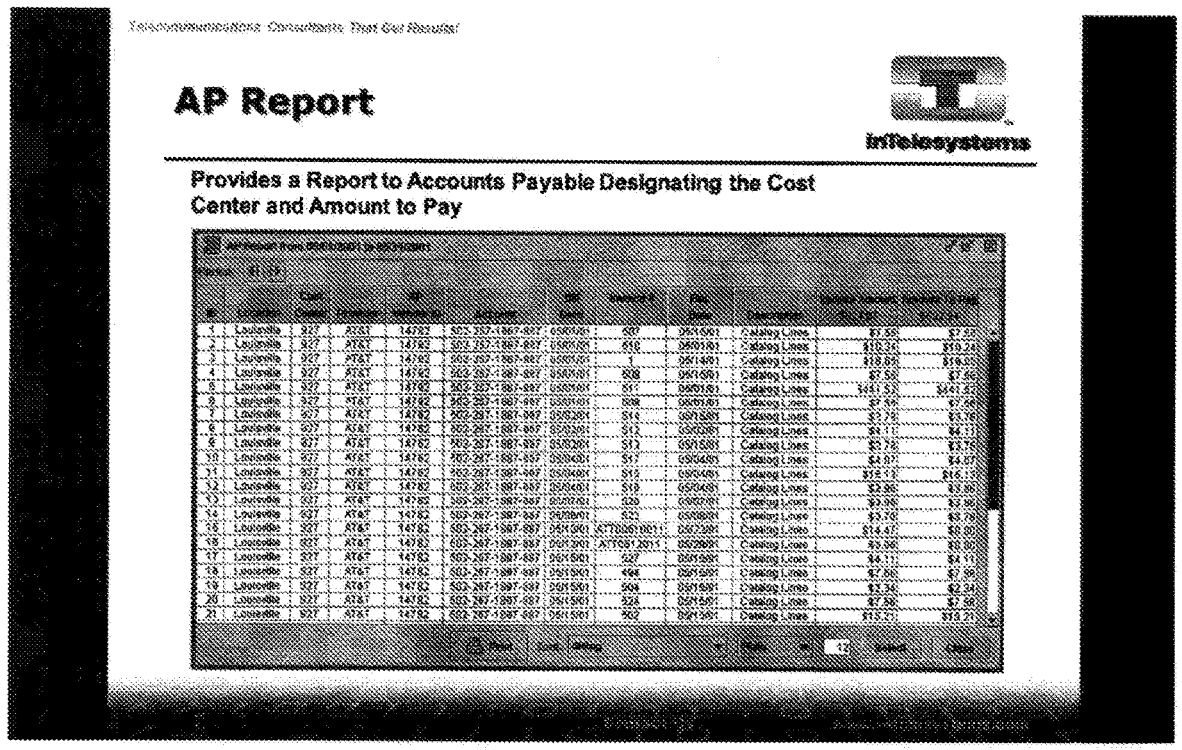
Figure 16:
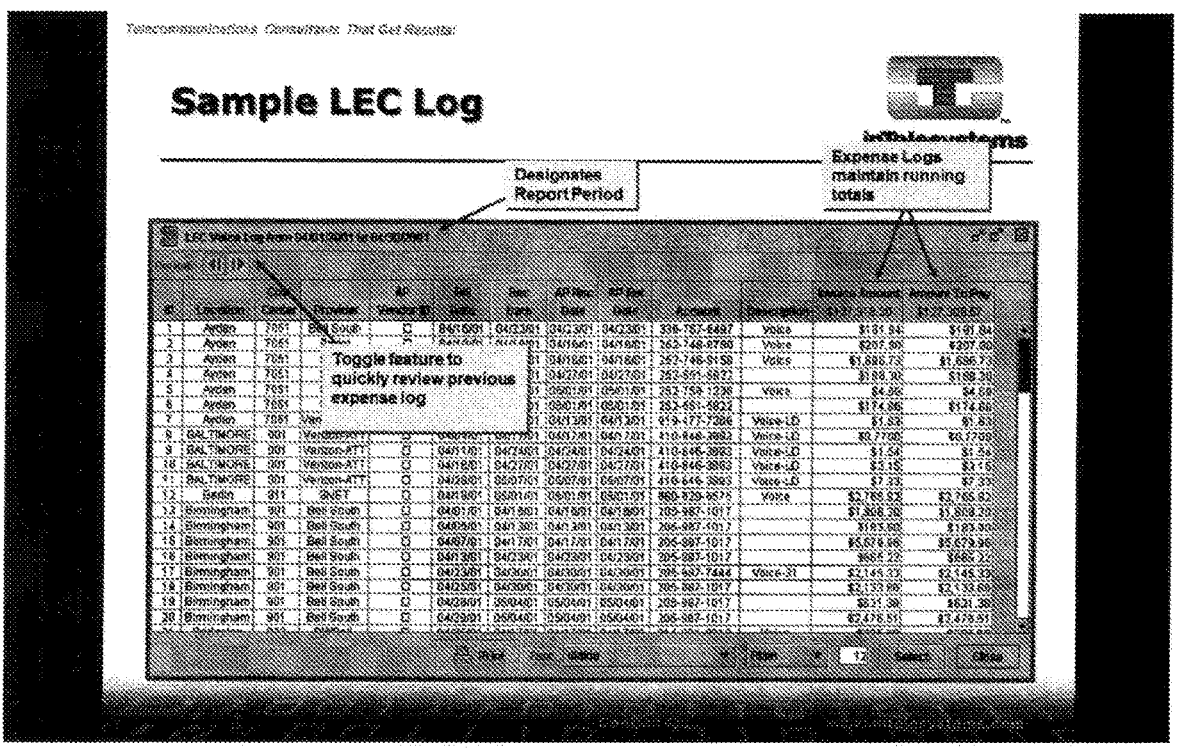
Figure 17:
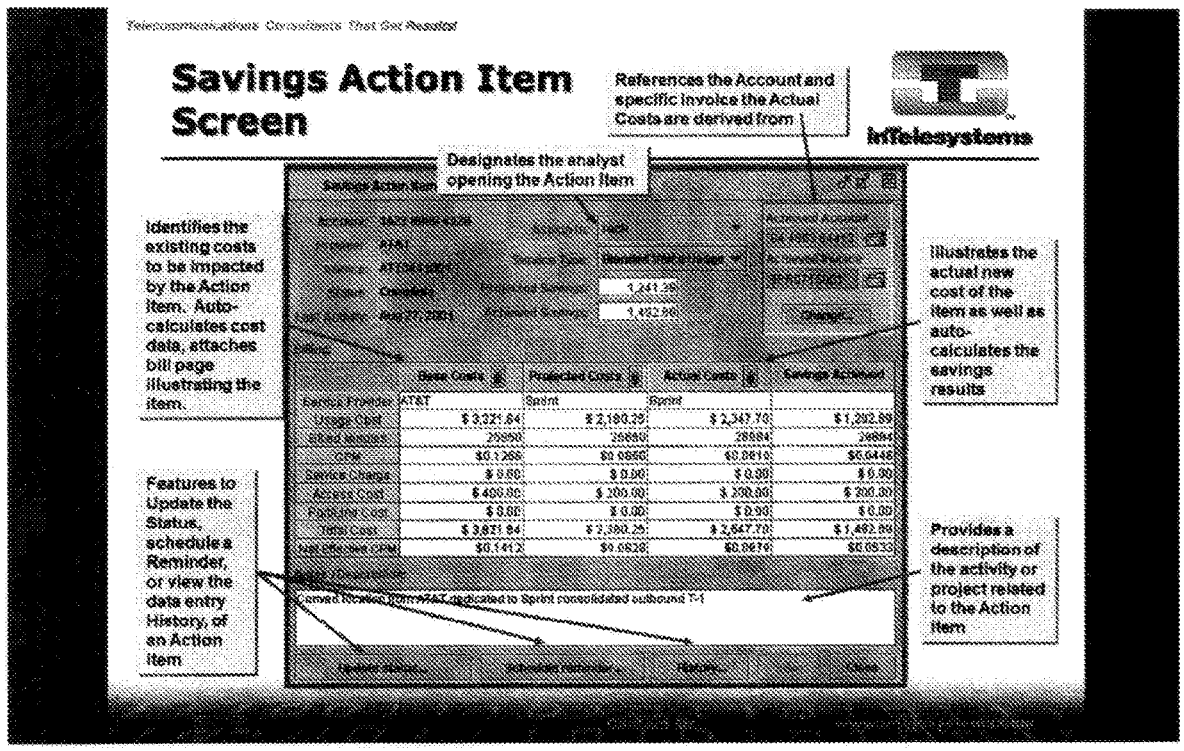
Figure 18:
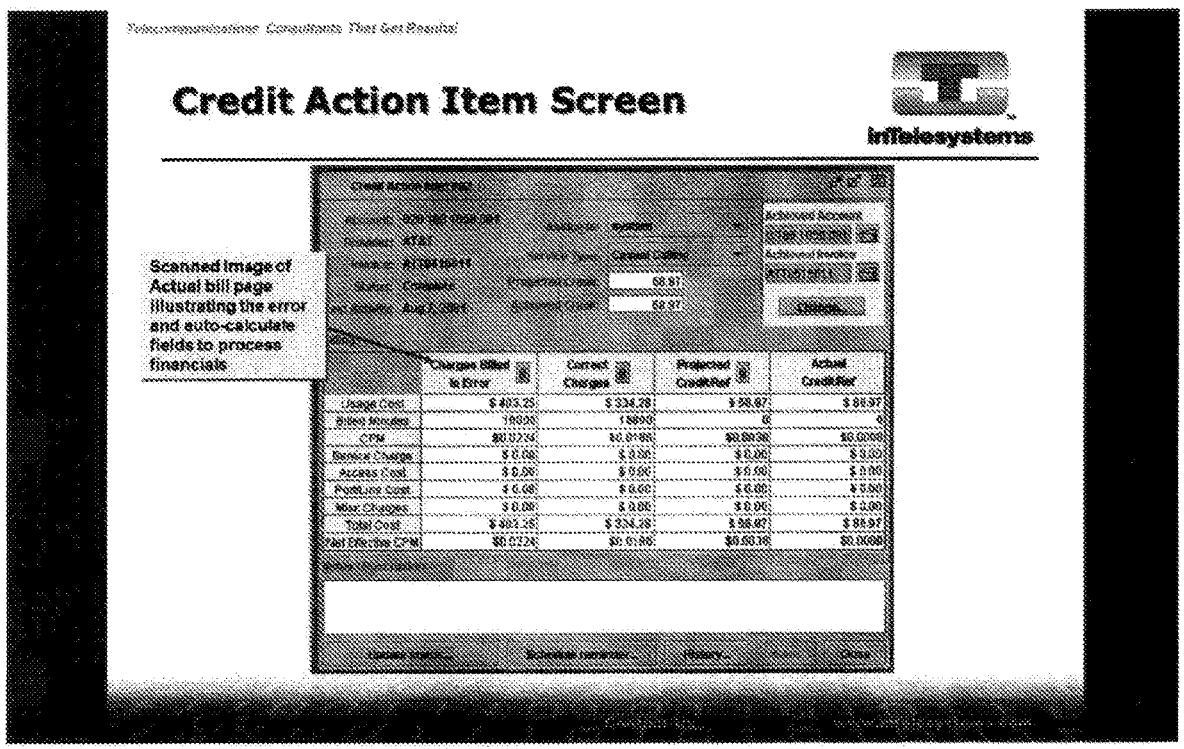
Figure 19:
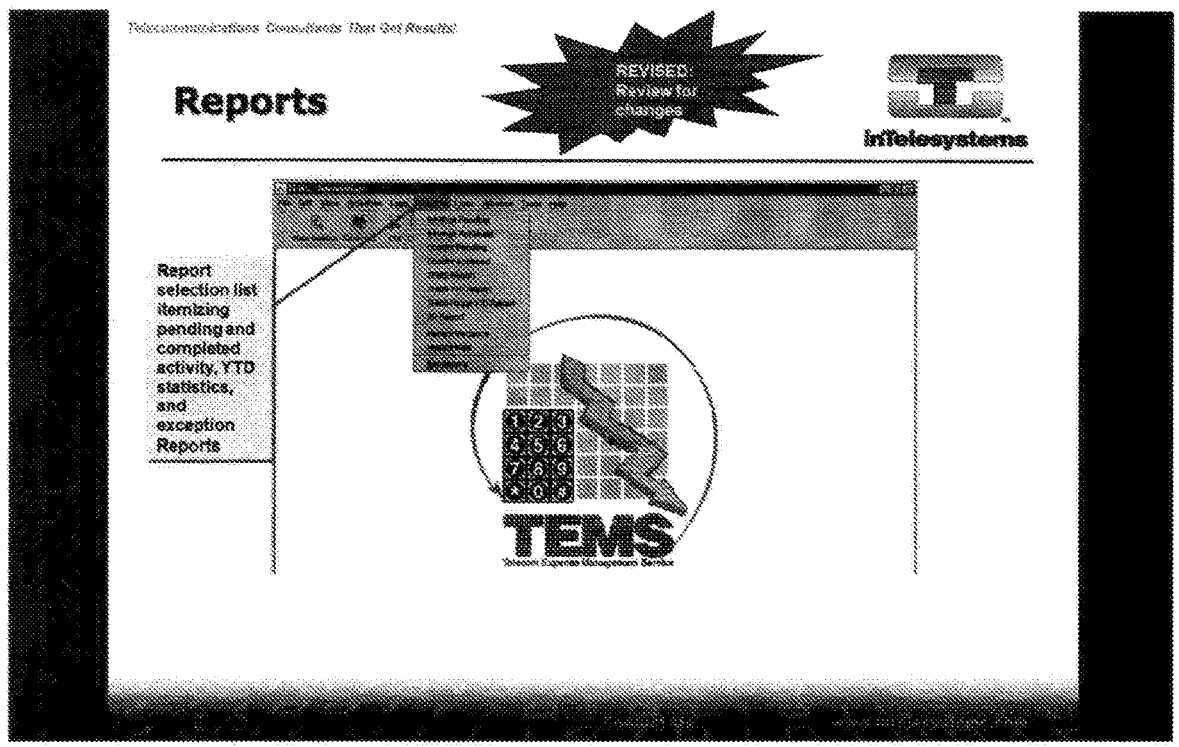
Figure 20:
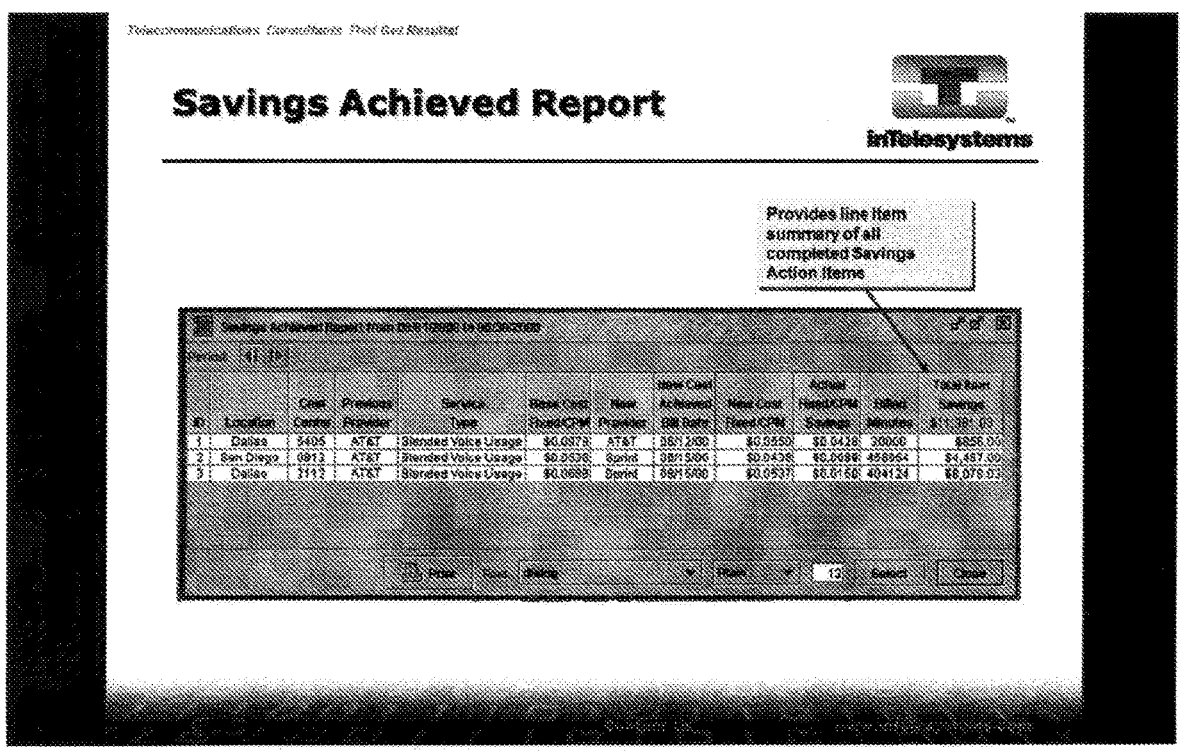
Figure 21:
Figure 22:
Figure 23:
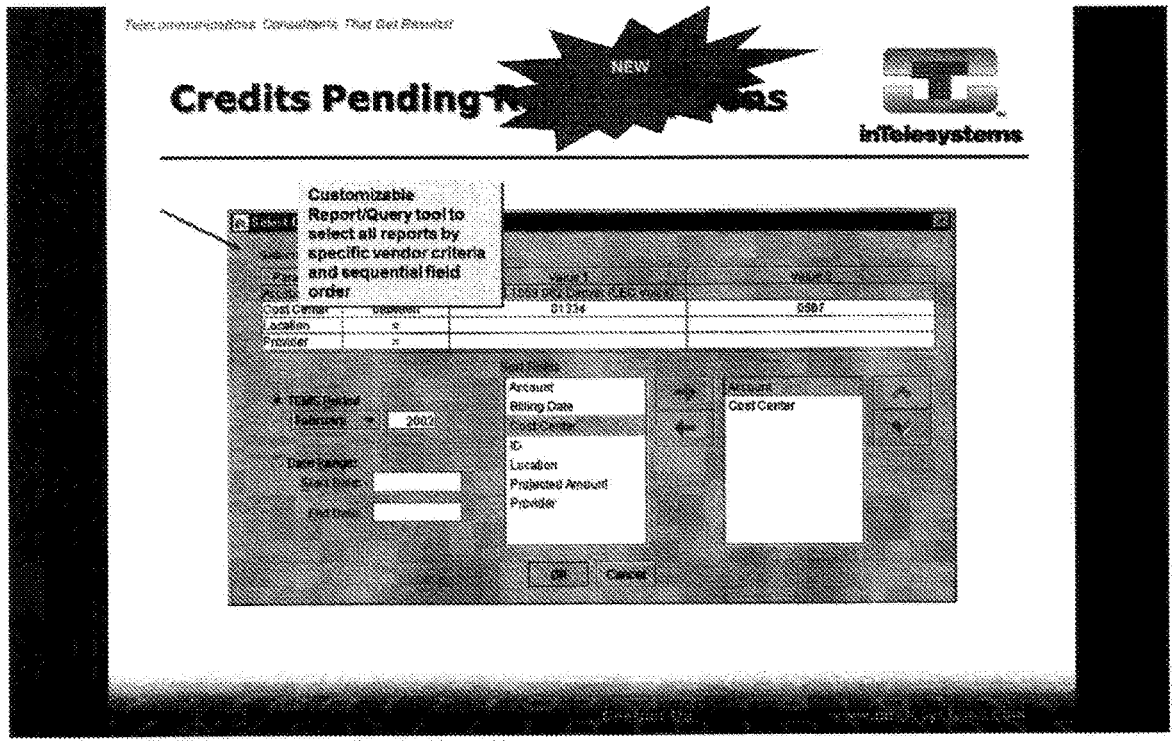
Figure 24:
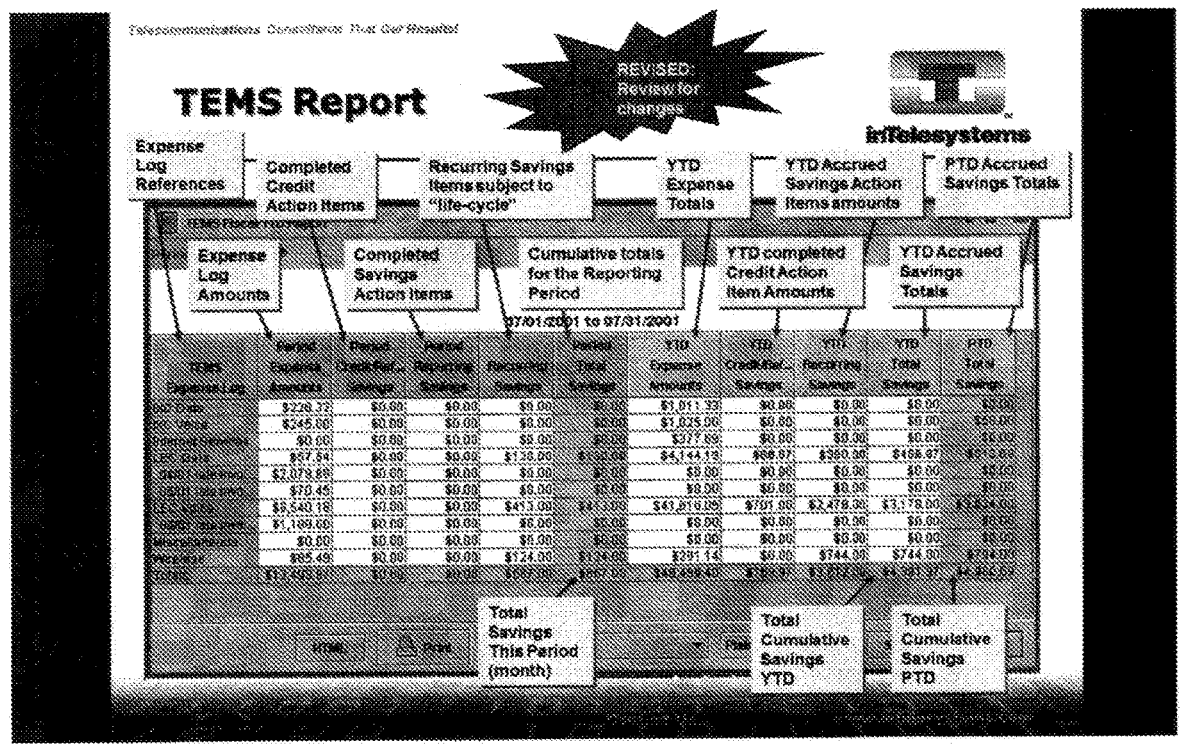
Figure 25:
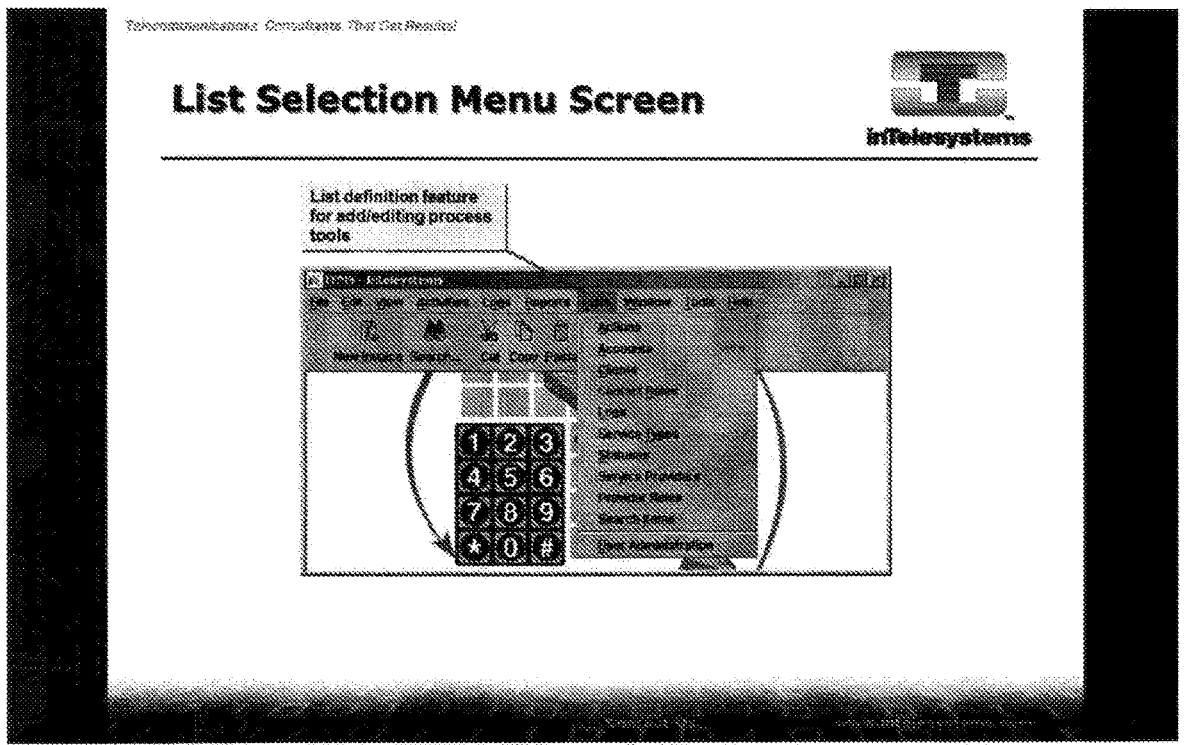
Figure 26:
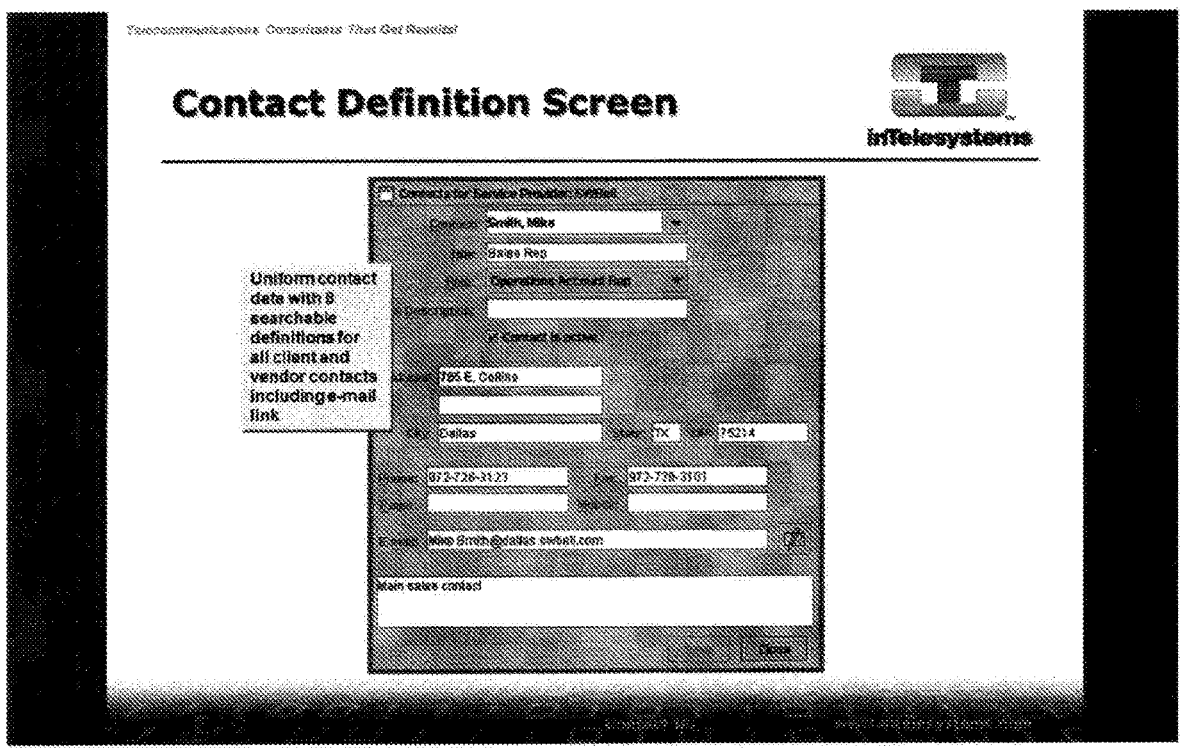

FIGS. 6A through 6C each depict Graphical User Interface (GUI) screenshots, or an explanatory portion thereof, for a preferred embodiment of order flow in eMail form associated with an ordering process example use of the present disclosure. FIG. 6A shows that upon completing the Create Order process, the Order eMail is generated, reflecting all Order options, and is sent to designated eMail address(es) on the distribution list. As shown in FIG. 6B, anyone on the distribution list can update the order by clicking "Reply". This will send out the update to the distribution list, as well as update the Service Request Report. When a Reply is sent, TEIMS cross references the eMail address on the order (in this case demodata@teims.net) against the unique Order ID (WID 29859), and determines the distribution list as assigned on Order creation. Thus, updates are sent to the correct distribution list. Finally, FIG. 6C shows that updates of Orders are received by the distribution list, and are highlighted for easier viewing of the order flow. When an order has been completed, it can be closed out by Replying to the eMail with the word "Close". The closing of the Order will also be reflected in the Service Request Report. Replies to Order eMails, utilizing Key Data Fields (e.g. Telephone Number, Circuit ID, etc.), can also be used to allow the system to automatically create Accounts in the TEIMS portal. By updating the order referencing one of these Key Data Fields, the generated Account will assign information based on selections made during the order creation process. Company, Company Code, Cost Center, Location, Log, Provider and User Name will all be automatically assigned to the new Account.

Figures 7A, 7B:
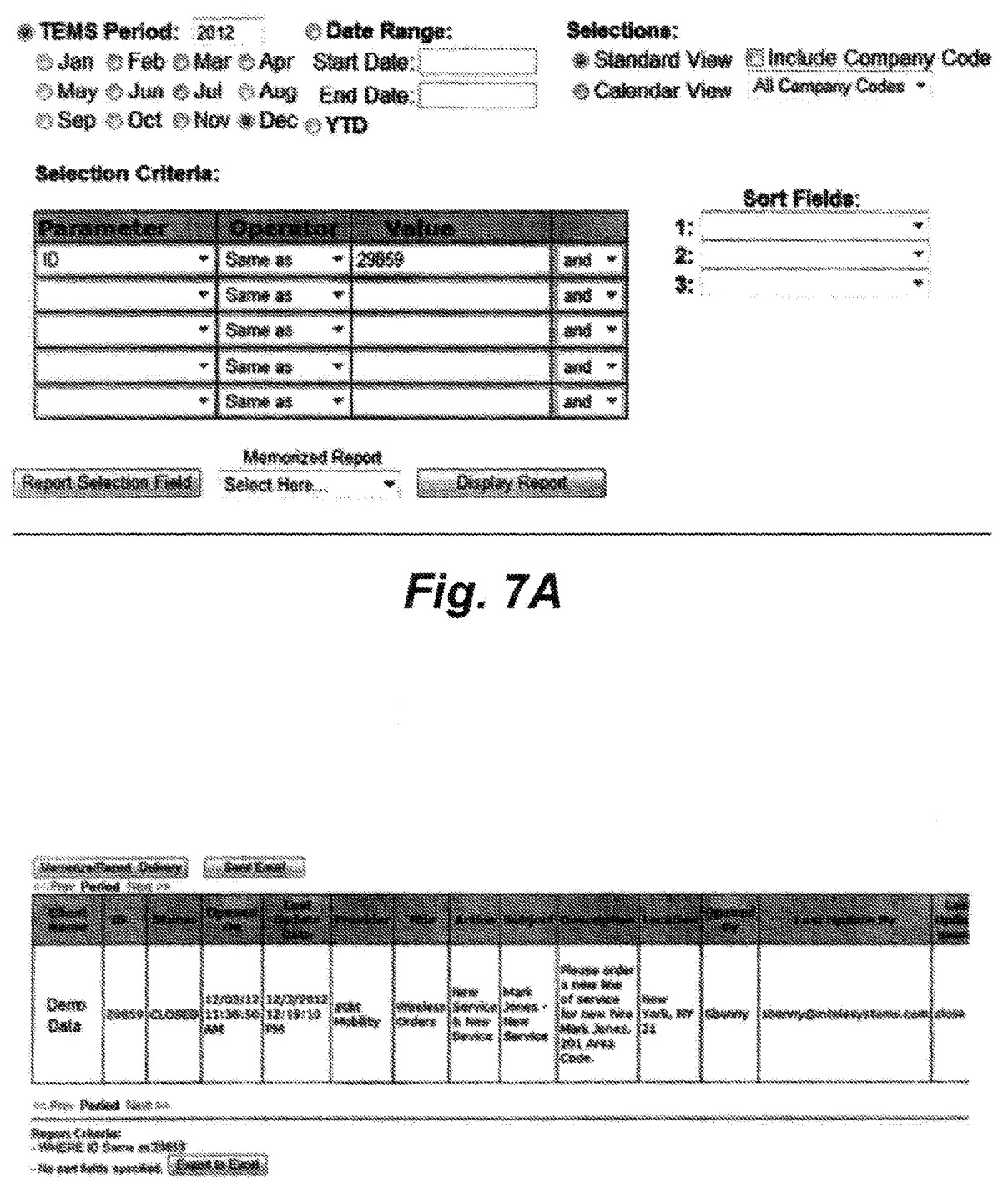

FIGS. 7A through 8B each depict Graphical User Interface (GUI) screenshots, or an explanatory portion thereof, for a preferred embodiment of order flow in syndication service form associated with an ordering process example use of the present disclosure. Orders can be reviewed and updated via the TEIMS Portal. Reports can be run for orders via the Service Request Report, and results can be limited via the TEMS Period (by month or year to date) or by a date range. Results can be further limited via the Selection Criteria, where individual order fields (e.g. Order ID, Opened By, Provider, Log, Subject, Last Modified Memo, etc.) can be searched. These Searches can also be memorized to create on-demand Reports, such as Open Order Reports, Reports for all Orders created by a particular User, or Reports for all Orders for a specific Provider. FIG. 7A shows an example of a Search performed using the Order ID/Service Request ID. FIG. 7B demonstrates that once the search completes, the results are displayed. Double-clicking on the Order will open the detail window. The FIG. 8A screen shows the full flow of the Order, including all updates. The green highlighting reflects the new Order being generated; blue represents updates, and grey Order closure. All updates are date- and time-stamped, as well as reflect the eMail address of the person that made the update. Update Duration is also reflected, which enables users to gauge efficiency of the parties involved in the request. Updates to Orders can be performed via the "Updates and Change Status" button. On the Updates screen of FIG. 8B, changes can be made to the Action, Due Date, Due Date and Update Reminders, Email Recipient List, etc. Updates can be made in the Memo box, which will result in update eMails being sent to the distribution list. In addition, orders can be Cancelled, Closed, or Re-Opened from this screen.

FIGS. 9 through 26 each depict Graphical User Interface (GUI) screenshots, or an explanatory portion thereof, for a preferred embodiment of relevant business process data participating in a similar manner as described in the ordering process example use of the present disclosure. The presently disclosed system and methods support a wide range of business enterprise applications. Those skilled in the relevant arts will recognize data of the user interfaces of FIGS. 9 through 26 and the potential business process collaboration between users involved with that data. A WID is used, and keywords may be used, in a similar manner as was heretofore described for the ordering process example elaborated above, for example when collaborating between eMail users and the syndication service(s) 106 for each of a variety of application types of data.

Company name and/or product name trademarks used herein belong to their respective companies.

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

What is claimed is:

1. A method for coordinating an activity or task, the method comprising:
    obtaining a unique identifier for one or more messages and a system enabled and controlled list, the unique identifier correlated with an activity or task;
    sending an electronic message containing the unique identifier to at least one recipient on the system enabled and controlled list, the electronic message sent through one or more messaging modalities of communication;
    receiving a response electronic message through the one of the messaging modality of communications through which the electronic message was sent, the response electronic message containing the unique identifier and response data concerning the activity or task;
    verifying that a sender of the response electronic message is on the system enabled and controlled list;
    if the sender is verified, correlating the response data from the response electronic message with the unique identifier and sending, through the one or more messaging modalities of communication, an additional electronic message containing the response data to the at least one recipient on the system enabled and controlled list as a reply or update concerning the activity or task;
    repeating the receiving, verifying, and sending to allow the at least one recipient on the system enabled and controlled list to both receive and communicate further updates on the activity or task using only the messaging modality of communication; and
    wherein at least one of the messaging modality of communications is an email or a text message.

2. The method of claim 1, wherein the unique identifier is identified in the electronic message by one or more symbols preceding the unique identifier, one or more symbols following the unique identifier, or a combination of one or more symbols before and after the unique identifier.

3. The method of claim 1, wherein the unique identifier is system or user generated.

4. The method of claim 1, wherein a user is granted access to the ability to receive and communicate further updates on the activity or task by adding a messaging modality address to the system enabled and controlled list.

5. The method of claim 1, wherein
    a user on the system enabled and controlled list has at least two messaging modality addresses of different types, each of the at least two messaging modality addresses stored on the system enabled and controlled list, and
    verifying that the sender of the response electronic message is a recipient on the system enabled and controlled list includes verifying that the response electronic messages contains one of the at least two messaging modality addresses for the user on the system enabled and controlled list.

6. The method of claim 5, wherein a first type of messaging modality address is an email address and a second type of messaging modality address is a text message address.

7. The method of claim 1, wherein the response electronic message contains an electronic file attachment, further comprising:
    storing the electronic file attachment in a manner to maintain association with the unique identifier.

8. The method of claim 1, further comprising: sending the electronic message to the at least one recipient using at least two different modalities of communication selected from an email, a text message, a voice message, and a video message.

9. The method of claim 1, wherein the at least one recipient is at least two recipients, the method further comprising:
    receiving response electronic message from each of the at least two recipients, respectively through a modality of communication through which the electronic message was sent, each of the response electronic messages containing the unique identifier and different updates to a status of the activity or task and reflecting additional information; and
    sending the additional electronic message to each of the at least two recipients as a reply to the response electronic messages, the additional electronic message including updates to the status of the activity or tasks and reflecting the additional information from each respective response electronic message.

10. The method of claim 1, wherein the response electronic message contains at least one additional recipient that is not on the system enabled and controlled list, further comprising:
    ignoring the at least one additional recipient that is not on the system enabled and controlled list by not adding the additional recipient to the system enabled and controlled list while still sending the additional electronic message to the at least one recipient on the system enabled and controlled list as a reply to the response electronic message.

11. The method of claim 1, wherein
    multiple response electronic messages are received; and
    in subsequent electronic messages sent to the at least one recipient on the system enabled and controlled list after such multiple response electronic messages, updates to a status of the activity or task are presented in chronological order according to a time respective response electronic messages are received.

12. The method of claim 1, further comprising:
    sending an update message to the at least one recipient based on one or more of due date, due date reminders, update frequency reminders, task assignment, or task change notifications based on an assignable schedule associated with a due date.

13. The method of claim 1, where the unique identifier is based at least partially upon a user selection.

14. A messaging program system comprising logic stored in a non-transitory computer readable media such that when executed is operable to:
    obtain a unique identifier for one or more messages and a system enabled and controlled list, the unique identifier correlated with an activity or task;
    send an electronic message containing the unique identifier to at least one recipient on the system enabled and controlled list, the electronic message sent through one or more messaging modalities of communication;
    receive a response electronic message through the one of the messaging modality of communications through which the electronic message was sent, the response electronic message containing the unique identifier and response data concerning the activity or task;
verify that a sender of the response electronic message is on the system enabled and controlled list; and
if the sender is verified, correlate the response data from the response electronic message with the unique identifier and send, through the one or more messaging modalities of communication, an additional electronic message containing the response data to the at least one recipient on the system enabled and controlled list as a reply or update concerning the activity or task;
repeating the receiving, verifying, and sending to allow the at least one recipient on the system enabled and controlled list to both receive and communicate further updates on the activity or task using only the messaging modality of communication; and
wherein at least one of the messaging modality of communications is an email or a text message.

15. The messaging program system of claim 14, wherein the unique identifier is identified in the electronic message by one or more symbols preceding the unique identifier, one or more symbols following the unique identifier, or a combination of one or more symbols before and after the unique identifier.

16. The messaging program system of claim 14, wherein the unique identifier is system or user generated.

17. The messaging program system of claim 14, wherein a user is granted access to the ability to receive and communicate further updates on the activity or task by adding a messaging modality address to the system enabled and controlled list.

18. The messaging program system of claim 14, wherein a user on the system enabled and controlled list has at least two messaging modality addresses of different types, each of the at least two messaging modality addresses stored on the system enabled and controlled list, and
verifying that the sender of the response electronic message is a recipient on the system enabled and controlled list includes verifying that the response electronic messages contains one of the at least two messaging modality addresses for the user on the system enabled and controlled list.

19. The messaging program system of claim 18, wherein a first type of messaging modality address is an email address and a second type of messaging modality address is a text message address.

20. The messaging program system of claim 14, wherein the response electronic message contains an electronic file attachment, and the logic stored in the non-transitory computer readable media when executed:
stores the electronic file attachment in a manner to maintain association with the unique identifier.

21. The messaging program system of claim 14, wherein the logic stored in the non-transitory computer readable media when executed:
sends the electronic message containing to the at least one recipient using at least two different modalities of communication selected from an email, a text message, a voice message, and a video message.

22. The messaging program system of claim 14, wherein the at least one recipient is at least two recipients, and the logic stored in the non-transitory computer readable media when executed:
receives response electronic message from each of the at least two recipients, respectively through a modality of communication through which the electronic message was sent, each of the response electronic messages containing the unique identifier and different updates to a status of the activity or task and reflecting additional information; and
sends the additional electronic message to each of the at least two recipients as a reply to the response electronic messages, the additional electronic message including updates to the status of the activity or tasks and reflecting the additional information from each respective response electronic message.

23. The messaging program system of claim 14, wherein the response electronic message contains at least one additional recipient that is not on the system enabled and controlled list, and the logic stored in the non-transitory computer readable media when executed:
ignores the at least one additional recipient that is not on the system enabled and controlled list by not adding the additional recipient to the system enabled and controlled list still sends the additional electronic message to the at least one recipient on the system enabled and controlled list as a reply to the response electronic message, the second electronic message including an update to a status of the activity or task.

24. The messaging program system of claim 14, wherein multiple response electronic messages are received; and
in subsequent electronic messages sent to the at least one recipient on the system enabled and controlled list after such multiple response electronic messages, updates to a status of the activity or task are presented in chronological order according to a time respective response electronic messages are received.

25. The messaging program system of claim 14, wherein the logic stored in the non-transitory computer readable media when executed:
sends an update message to the at least one recipient based on one or more of due date, due date reminders, update frequency reminders, task assignment, or task change notifications based on an assignable schedule associated with a due date.

26. The messaging program system of claim 14, wherein the unique identifier is based at least partially upon a user selection.

27. The method of claim 1, wherein the unique identifier is based at least partially upon a location of the activity or task.

28. The messaging program system of claim 14, wherein the unique identifier is based at least partially upon a location of the activity or task.

* * * * *